(12) United States Patent
DeCecca et al.

(10) Patent No.: US 6,427,322 B1
(45) Date of Patent: Aug. 6, 2002

(54) REGISTRATION MECHANISM AND METHOD

(75) Inventors: Michael L. DeCecca, Fairport; Joseph A. Watkins, Rochester; Duane B. Kirk, Hilton, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/464,427

(22) Filed: Dec. 16, 1999

(51) Int. Cl.$^7$ ................................................ B23P 19/00
(52) U.S. Cl. ........................ 29/806; 198/775; 269/309; 29/464
(58) Field of Search .......................... 29/806, 563, 564, 29/33 P, 464; 269/309; 198/465.1, 465.2, 775

(56) References Cited

U.S. PATENT DOCUMENTS

| | | | |
|---|---|---|---|
| 2,903,120 A | | 9/1959 | Thomas |
| 3,010,371 A | | 11/1961 | Riedel et al. |
| 3,793,738 A | | 2/1974 | Blakey |
| 3,805,942 A | | 4/1974 | Auernhammer |
| 3,888,341 A | | 6/1975 | Konkal et al. |
| 4,148,400 A | | 4/1979 | Cross |
| 4,185,812 A | | 1/1980 | Hall |
| 4,201,284 A | | 5/1980 | Brems |
| 4,253,559 A | * | 3/1981 | Myers et al. |
| 4,331,229 A | | 5/1982 | Kamm |
| 4,390,172 A | | 6/1983 | Gotman |
| 4,394,897 A | | 7/1983 | Brems |
| 4,444,541 A | * | 4/1984 | Bergman ..................... 269/369 |
| 4,552,260 A | * | 11/1985 | Teagno et al. ............... 29/33 P |
| 4,583,631 A | * | 4/1986 | Yonezawa et al. |
| 4,603,770 A | | 8/1986 | Hartness |
| 4,629,384 A | * | 12/1986 | Beshke et al. ............... 269/309 |
| 4,656,737 A | | 4/1987 | Shimizu et al. |
| 4,761,696 A | | 8/1988 | Muller et al. |
| 4,850,102 A | | 7/1989 | Hironaka et al. |
| 4,854,440 A | | 8/1989 | Laube et al. |
| 4,854,532 A | | 8/1989 | Trovato |
| 4,896,086 A | * | 1/1990 | Miyahara et al. ........... 269/309 |
| 5,058,251 A | | 10/1991 | Jones |
| 5,062,188 A | | 11/1991 | Jones et al. |
| 5,167,589 A | | 12/1992 | Wawrzyniak et al. |
| 5,197,172 A | | 3/1993 | Takagi et al. |
| 5,226,211 A | | 7/1993 | Jones |
| 5,242,043 A | | 9/1993 | Sturm |
| 5,439,091 A | | 8/1995 | Mason |
| 5,531,005 A | * | 7/1996 | Morshavoer |
| 5,560,309 A | | 10/1996 | Conley, Jr. et al. |
| 5,606,842 A | | 3/1997 | Sakamoto et al. |
| 5,689,876 A | | 11/1997 | Suzuki et al. |
| 6,293,534 B1 | * | 9/2001 | Leban ......................... 269/309 |

* cited by examiner

*Primary Examiner*—S. Thomas Hughes
*Assistant Examiner*—Steven A Blount
(74) *Attorney, Agent, or Firm*—Robert Luke Walker

(57) ABSTRACT

A registration mechanism has a datum unit and a bolster movable toward and away from the datum unit. First, second, and third pins are mounted to the bolster. At least one spring resiliently biases the pins outward from the bolster. A pallet is supported by the pins between the bolster and datum unit. The pallet has first, second, and third sockets aligned with respective pins. The pallet has a registering face facing the datum unit. The registering face is disposed opposite the sockets. The pallet is movable by the bolster toward the datum unit from a lowered position. In the lowered position, the registering face is spaced from the datum unit and respective pins and sockets are spaced apart. In a first intermediate position, the registering face is spaced from the datum unit, and the sockets rest freely on respective pins. In a second intermediate position, respective sockets and pins are pressed together in partial counteraction of the resilient biasing. In a raised position, the registering face and datum unit are a clamped together and the sockets are immobilized relative to the pins.

25 Claims, 32 Drawing Sheets

REGISTRATION MECHANISM AND METHOD

CROSS REFERENCE TO RELATED APPLICATIONS

Reference is made to commonly assigned, U.S. patent application Ser. No. 09/464,555, now U.S. Pat. No. 6,354, 431, entitled: DARK BOX-TRANSFER APPARATUS AND MANUFACTURING SYSTEM, filed in the names of Michael DeCecca, Joseph A. Watkins, and Duane B. Kirk each of which is assigned to the assignee of this application.

FIELD OF THE INVENTION

The invention relates to positioning equipment and methods for manufacturing and more particularly relates to a registration mechanism and method.

BACKGROUND OF THE INVENTION

A variety of procedures are known in which one-time use cameras are loaded with film, and the film is prewound in the dark. An example of this kind of procedure is disclosed in U.S. Pat. No. 5,689,876. During film loading, a onetime use camera frame assembly, that is, a camera or incomplete camera subunit, is moved through a series of workstations by a rotary turntable or a conveyor. A dark box encloses the film loading workstations. Camera frame assemblies enter and leave the dark box through light-lock doors. Dark conditions are maintained during film loading steps until the camera frame assemblies are light-tightly closed by installation of camera backs.

For film loading, accurate positioning of the camera frame assemblies in the workstations is critical. Rapid movement from station to station is highly desirable. Accurate positioning of the camera frame assemblies during transit between workstations is not important. U.S. Pat. No. 4,331, 229 discloses a manufacturing machine in which pallets are moved from the station to station on a conveyor belt. At each station, the pallet is lifted from the belt and accurately positioned for access by the tooling of that workstation. The manufacturing machine of this patent provides accurate positioning at the workstations and can provide rapid movement from station the station. The manufacturing machine has the shortcoming; however, that exacting measures must be taken independently, at each station, to insurer accurate positioning. This may also be a strength, in general use under lighted conditions, since it would appear that a workstation could be serviced without necessarily disaccommodating the remainder of the manufacturing machine. Dark conditions would make this impractical, since use of light during servicing would avert usage of all the workstations.

A variety of different apparatus and methods are known for transporting and registering pallets and workpieces, such as U.S. Pat. Nos. 3,888,341; 4,148,400; 4,201,284; 4,394, 897; 4,850,102; 4,854,532; 5,058,251; 5,062,188; 5,167, 589; 5,197,172; 5,226,211; and 5,242,043. Features disclosed in one or more of these patents include use of a transfer bar, pallet clamping, and pallet locating using multiple, orthogonally arranged support points. Various of the disclosed devices have a number of shortcomings, such as: complexity; excess moving mass that is necessary for a high weight carrying capacity, but is excessive for light, rapid manufacturing; overconstrained registration mechanisms requiring more than a minimum of precision parts, and pallet movement systems that require precision parts that are subject to high rates of wear during use.

It would thus be desirable to provide an improved registration mechanism and method which is simple, not overconstrained and requires a relatively low number of precision parts.

SUMMARY OF THE INVENTION

The invention is defined by the claims. The invention, in some of its broader aspects, provides a registration mechanism that has a datum unit and a bolster movable toward and away from the datum unit. First, second, and third pins are mounted to the bolster. At least one spring resiliently biases the pins outward from the bolster. A pallet is supported by the pins between the bolster and datum unit. The pallet has first, second, and third sockets aligned with respective pins. The pallet has a registering face facing the datum unit. The registering face is disposed opposite the sockets. The pallet is movable by the bolster toward the datum unit from a lowered position. In the lowered position, the registering face is spaced from the datum unit and respective pins and sockets are spaced apart. In a first intermediate position, the registering face is spaced from the datum unit, and the sockets rest freely on respective pins. In a second intermediate position, respective sockets and pins are pressed together in partial counteraction of the resilient biasing. In a raised position, the registering face and datum unit are clamped together and the sockets are immobilized relative to the pins.

It is an advantageous effect of at least some of the embodiments of the invention that an improved film loading apparatus is provided which is relatively quick and easy to set up and in which camera frame assemblies can be rapidly moved between workstations and accurately positioned in workstations.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
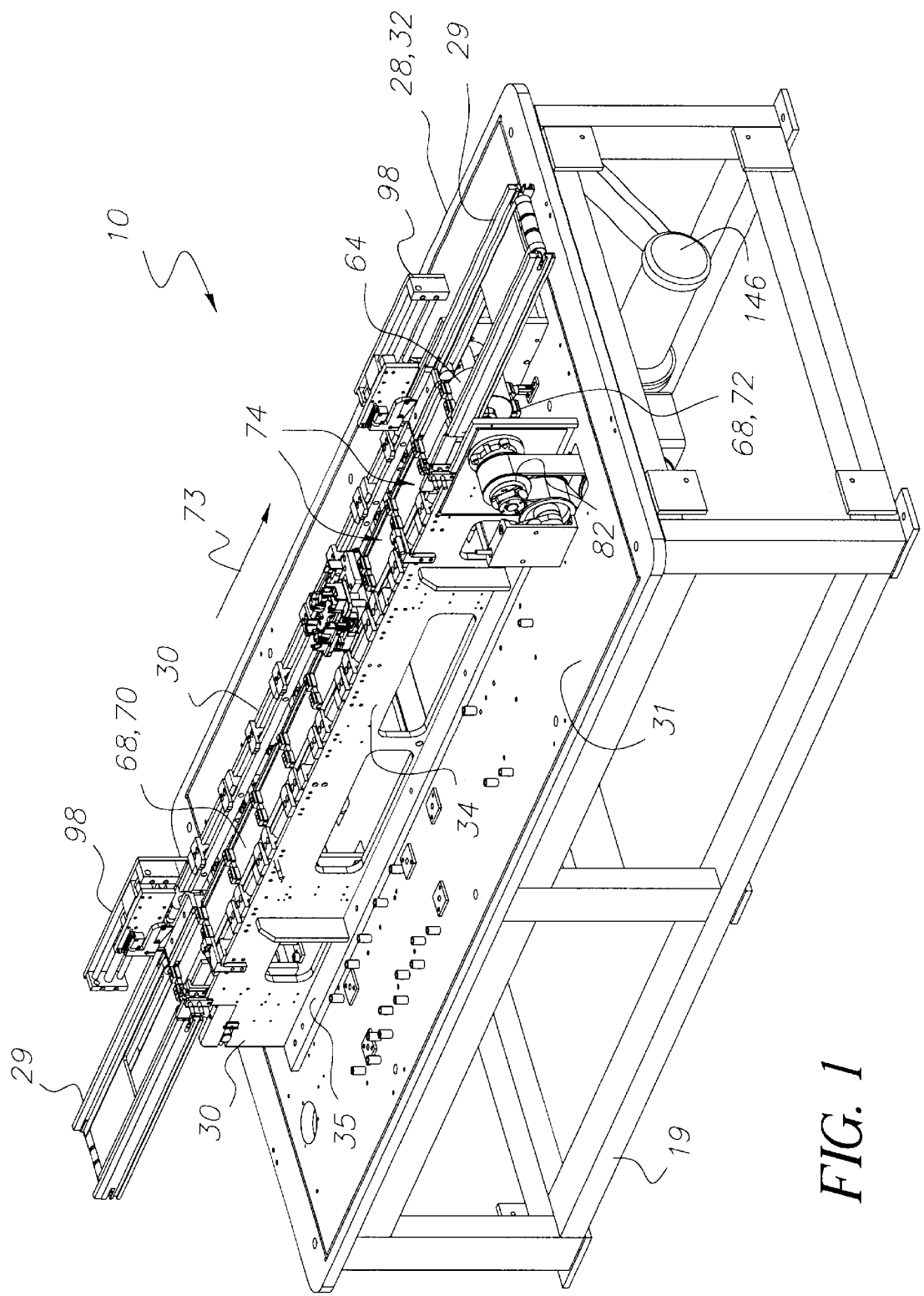
FIG. 1 is a perspective view of the transfer and registration apparatus. A single pallet is illustrated in one of the cradles of the apparatus. The housing is not shown and infeed and outfeed conveyors are partially cut-away.
Figure 2:
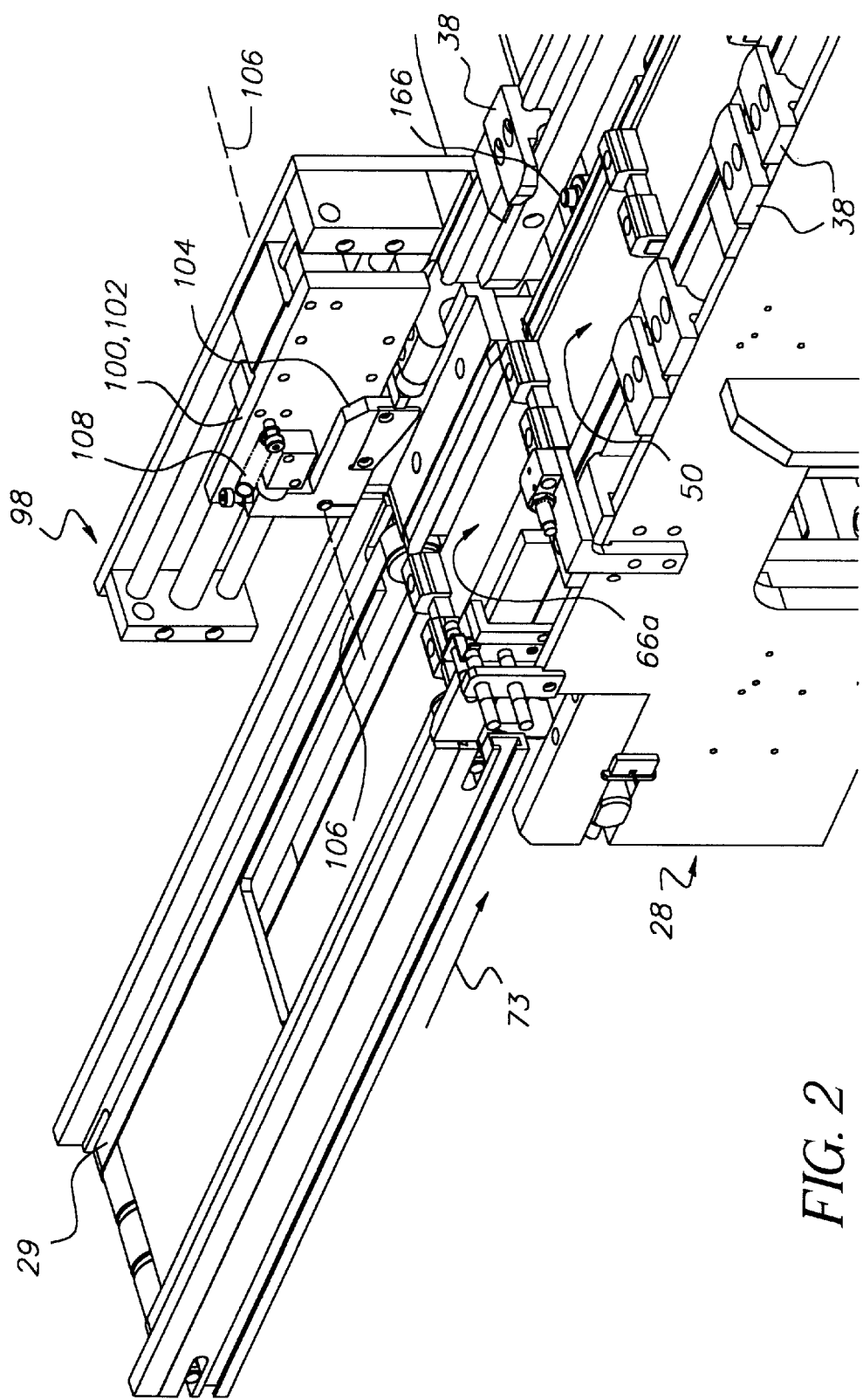
FIG. 2 is a partial enlargement of the infeed end of the apparatus of FIG. 1.

Referring initially to FIGS. 1–12B, the apparatus 10 provides both transfer and registration of workpieces 12, on pallets 11, in a sequence of workstations 14. In preferred embodiments, the workpieces 12 are palletized camera frame assemblies 12a (shown in FIG. 11), into which film is loaded, and the apparatus 10 includes a light-excluding enclosure or housing 16 that functions as a dark-box for the workstations 14. Such embodiments are preferred, but are not limiting. For example, the apparatus 10 can be used with other types of workpieces 12. The enclosure 16 can be eliminated if the work performed is not light-sensitive. The workpieces 12 can be "non-palletized", that is, the workpieces 12 themselves can include a portion that acts as a pallet 11. The apparatus 10 can be modified to provide only transfer or registration. The apparatus 10 can be limited to a single workstation 14. It will be understood, from the embodiments discussed in detail herein, that like considerations apply to the other embodiments.

Referring now primarily to FIGS. 6–8 and 10, the housing 16 has a main chamber 18 and light-locking entry and exit chambers 20,22 at either end that lead into and out of the main chamber 18. The entry and exit chambers 20,22 each have spaced apart, light-tight, inner and outer doors 24,26. (Doors 24,26 are each shown in open position in FIGS. 6–8) For each chamber 14,16, the doors 24,26 are movable one at a time to prevent admission of light. At the entry chamber 20, camera frame assemblies 12a are moved through the outer door 24, and into a space enclosed by the entry chamber 20. The outer door 26 is then shut and the inner door 24 is opened for movement of the camera frame assemblies 12a into the main chamber 18. After film loading, the reverse of this process is followed for the exit chamber 22.

In a particular embodiment shown in FIGS. 1–8, the housing 16 has main, entry, and exit chambers 18,20,22 and a pair of connecting tunnels 23 connecting the entry and exit chambers 20,22 to the main chamber 18. Entry and exit conveyors 25,27 are disposed in the entry and exit chambers 20,22, respectively; and stub conveyors 29 extend from the entry and exit conveyors 25,27 to the main chamber 18. Adjoining conveyors 25,29 and 29,27 are close together to provide an uninterrupted path when the respective inner door 24 is open.

Referring now primarily to FIGS. 1–5, a table 28 has a support surface 31 that is within the main chamber 18 and a main support 19 that may or may not be in the main chamber 18. The remainder of the table 28 can be joined to or within the main chamber 18. The table 28 has a pair of parallel flanges 30. The flanges 30 are each joined to a table base 32 that includes support surface 31. Each flange 30 has an upwardly facing leg 34 and an outwardly facing leg 35.

The upwardly facing legs 34 are spaced apart by a uniform gap. The table base 32 can be immobile, but it is preferred that the table base 32 is a relatively light-weight support structure.

The table 28 has a sequence of datum units 36. Each datum unit 36 has a single continuous datum pad 38 or is subdivided into two or more separated datum pads 38. It is preferred that datum pads 38 be joined to both flanges 30. In a particular embodiment of the invention, each datum unit 36 has three datum pads 38, with two of the pads 38 located on one of the flanges 30 and the third pad 38 located on the other flange 30. The datum pads 38 can be continuous with the rest of the table 28, but for ease of manufacture and replacement after wear or damage, it is preferred that each datum pad 38 be removably joined to the remainder of the table 28. When joined to the table 28, datum pads 38 are immobile relative to the remainder of the table 28.

Figure 3:
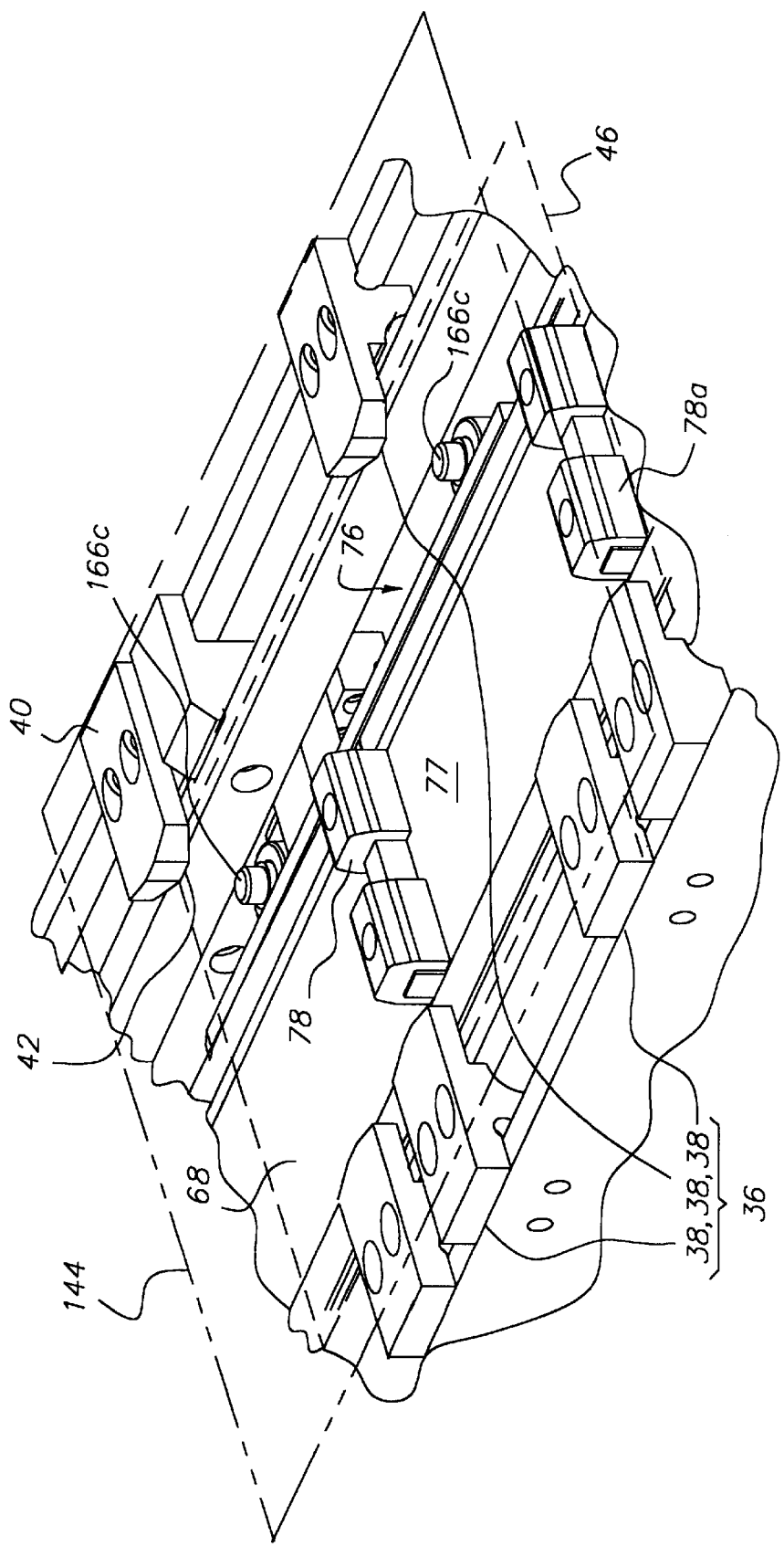
FIG. 3 is a partial enlargement of part of the middle section of the apparatus of FIG. 1. The registration surface defined by the datum pads is indicated by a dashed line. The alignment surface defined by the datum pads is indicated by a dot-dash line.
Figure 4:
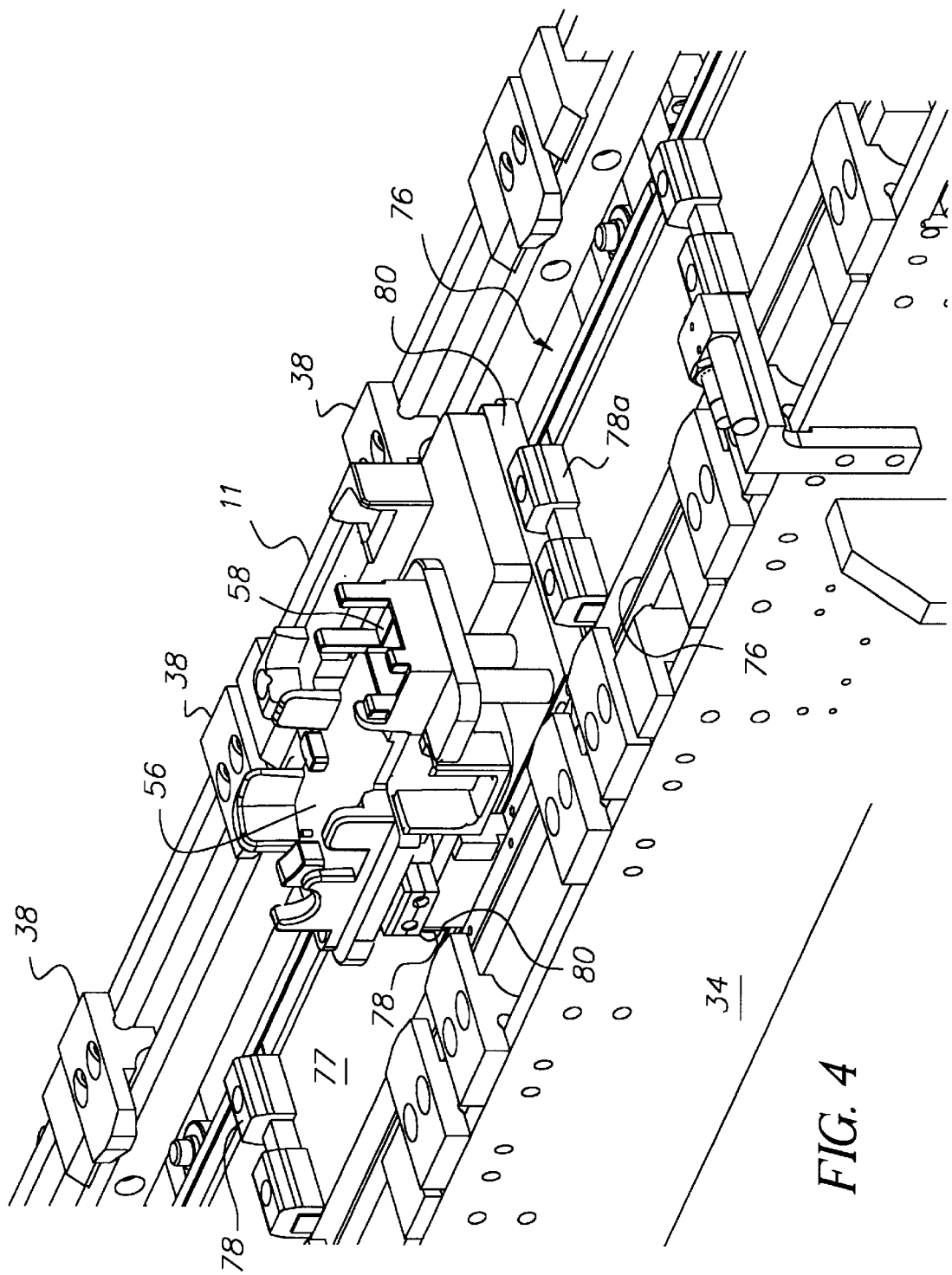
FIG. 4 is a partial enlargement of the pallet and another part of the middle section of the apparatus of FIG. 1.
Figure 46:
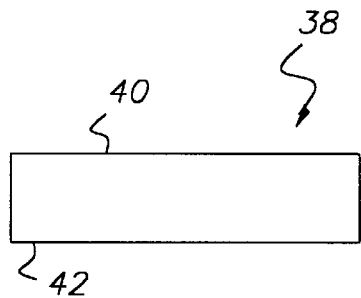
FIGS. 46–49 are cross-sectional view of alternative datum pads.
Figure 47:
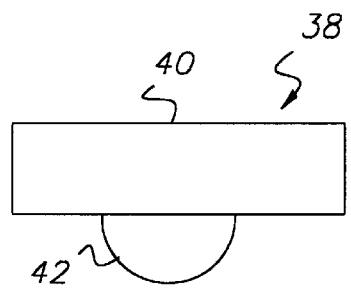
Figure 48:
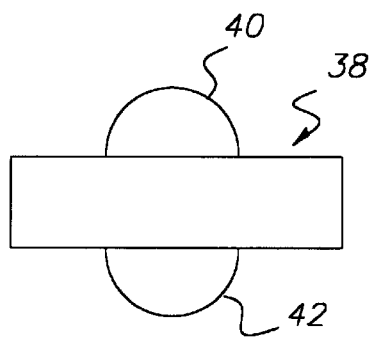
Figure 49:
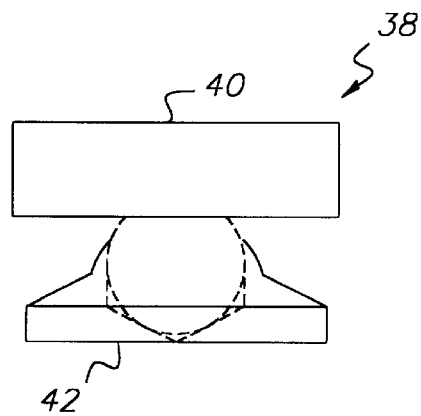

The datum pads 38 have opposed alignment and registration faces 40,42. It is highly preferred that each datum pad 38 has both an alignment face 40 and a registration face 42 and that the alignment face 40 and registration face 42 are permanently aligned. Faces 40,42 can have curved or complex shapes, but are preferably flat or spherical, as shown in FIGS. 46–48. Threaded holes or other fastener subparts can be offset or recessed, as can be seen in FIG. 3. Flat and parallel alignment and registration faces 40,42 are convenient to work with during both manufacture and use of the apparatus 10. Remaining portions of datum pads 38 can be shaped as convenient. It is currently preferred that datum pads are immobile, however, datum pads can be gimballed as shown in FIG. 49.

The datum pads 38 are joined to the table 28 in a predetermined arrangement such that the alignment faces 40 together define an alignment surface 44 and the registration faces 42 together define a registration surface 46. (With gimballed datum pads 38, the surfaces 44,46 are defined when the pads are in a neutral position in which the surfaces are aligned with travel and cross-track axes (discussed below).) The alignment and registration surfaces 44,46, each combine the shapes of the respective alignment and registration faces 40,42. In the apparatus shown in FIG. 3, the alignment surface 44 and the registration surface 46 are each planar and the registration surface underlies the alignment surface. Planar alignment and registration surfaces 44,46 are convenient for apparatus set-up, but other, more complex shapes, such as laterally stepped planes, can also be used.

Figure 10:
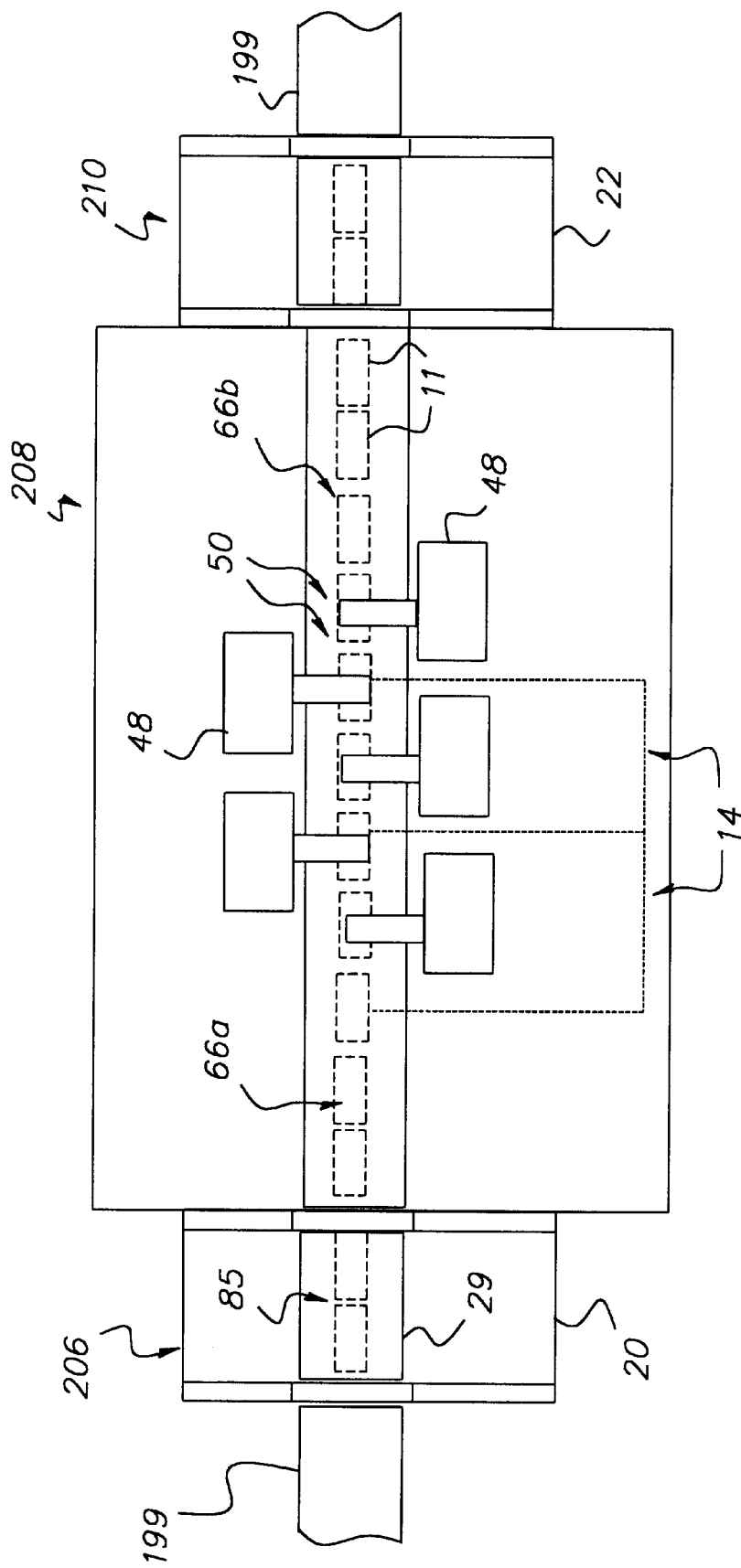
FIG. 10 is a diagrammatical top view of another embodiment of the transfer and registration apparatus. Pallets are indicated by dashed lines.
Figure 11:
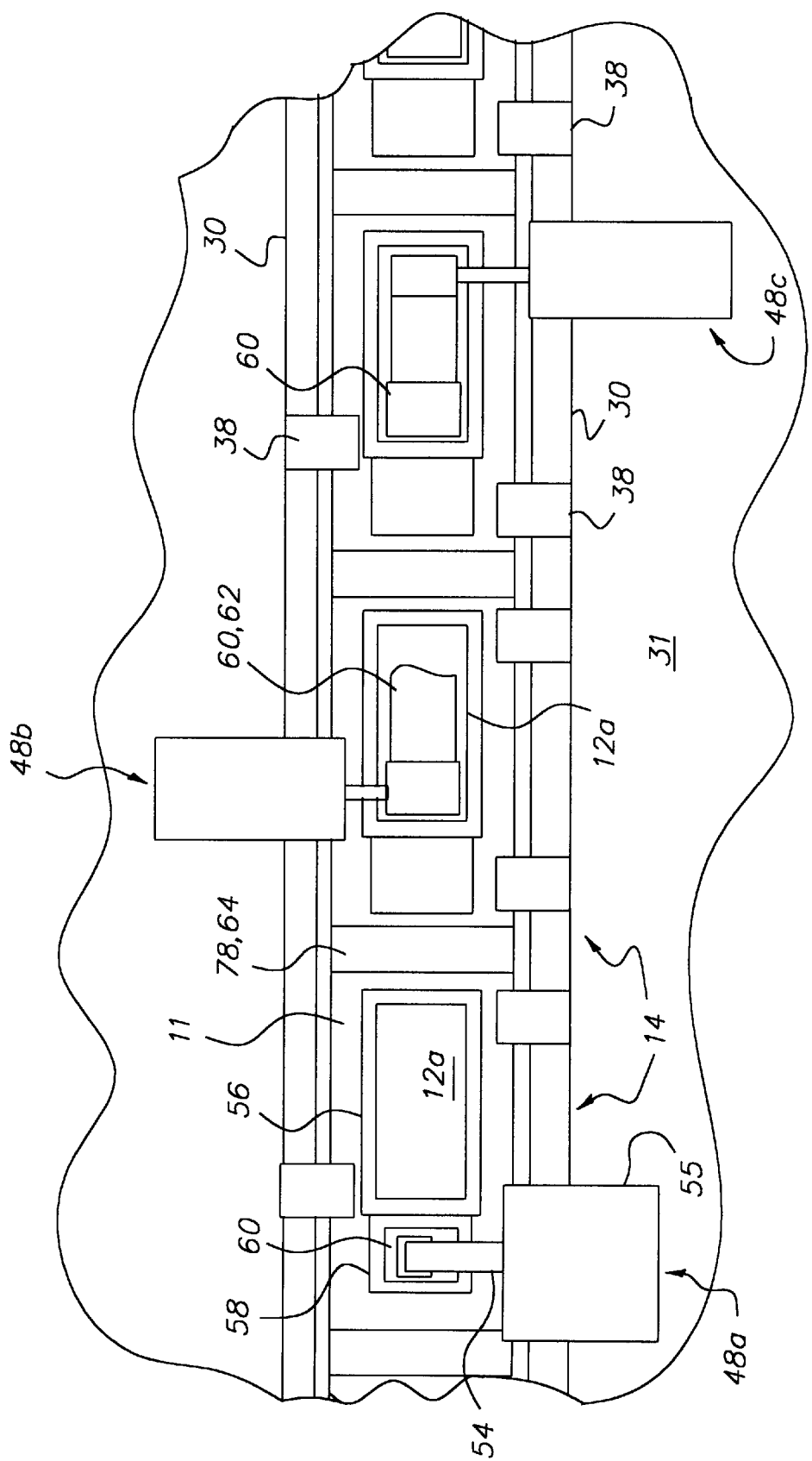
FIG. 11 is a semi-diagrammatical top view corresponding to a partial enlargement of the view of FIG. 10.
Figure 12A:
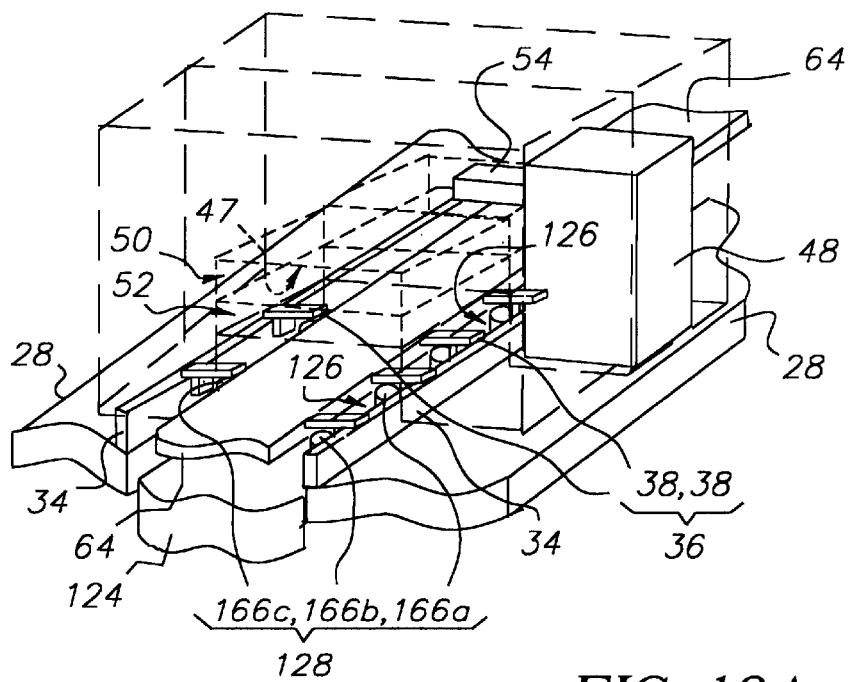
FIG. 12A is a diagrammatical perspective view of part of the apparatus of FIG. 9. Two workstations are shown by dashed lines having larger dashes. The boundaries of the indexing sites and registration sites within the workstations are indicated by dashed lines having smaller dashes. The transport, bolster, and table are shown cut-away.
Figure 12B:
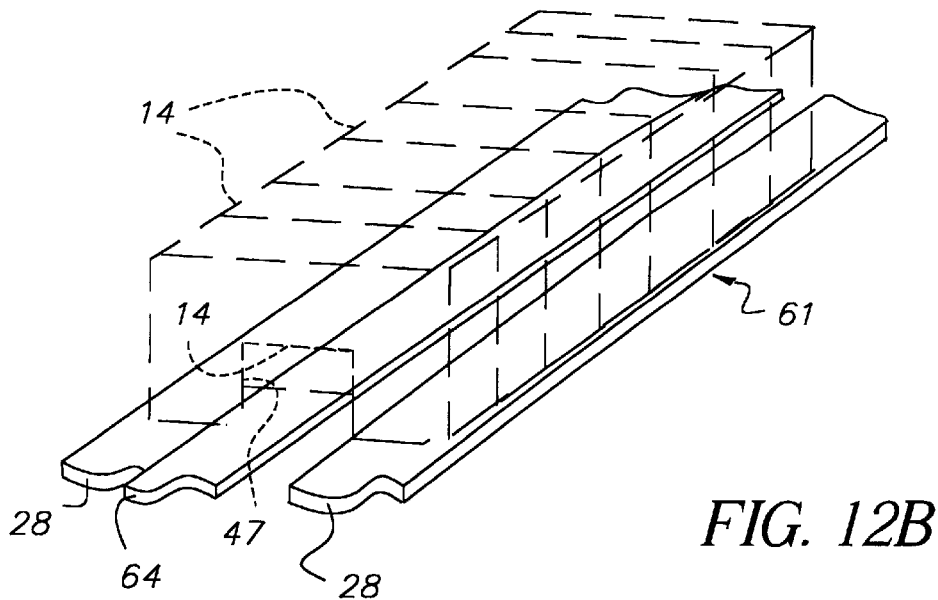
FIG. 12B is another diagrammatical perspective view of part of the apparatus of FIG. 9 showing the work device area of the apparatus.
Figure 13:
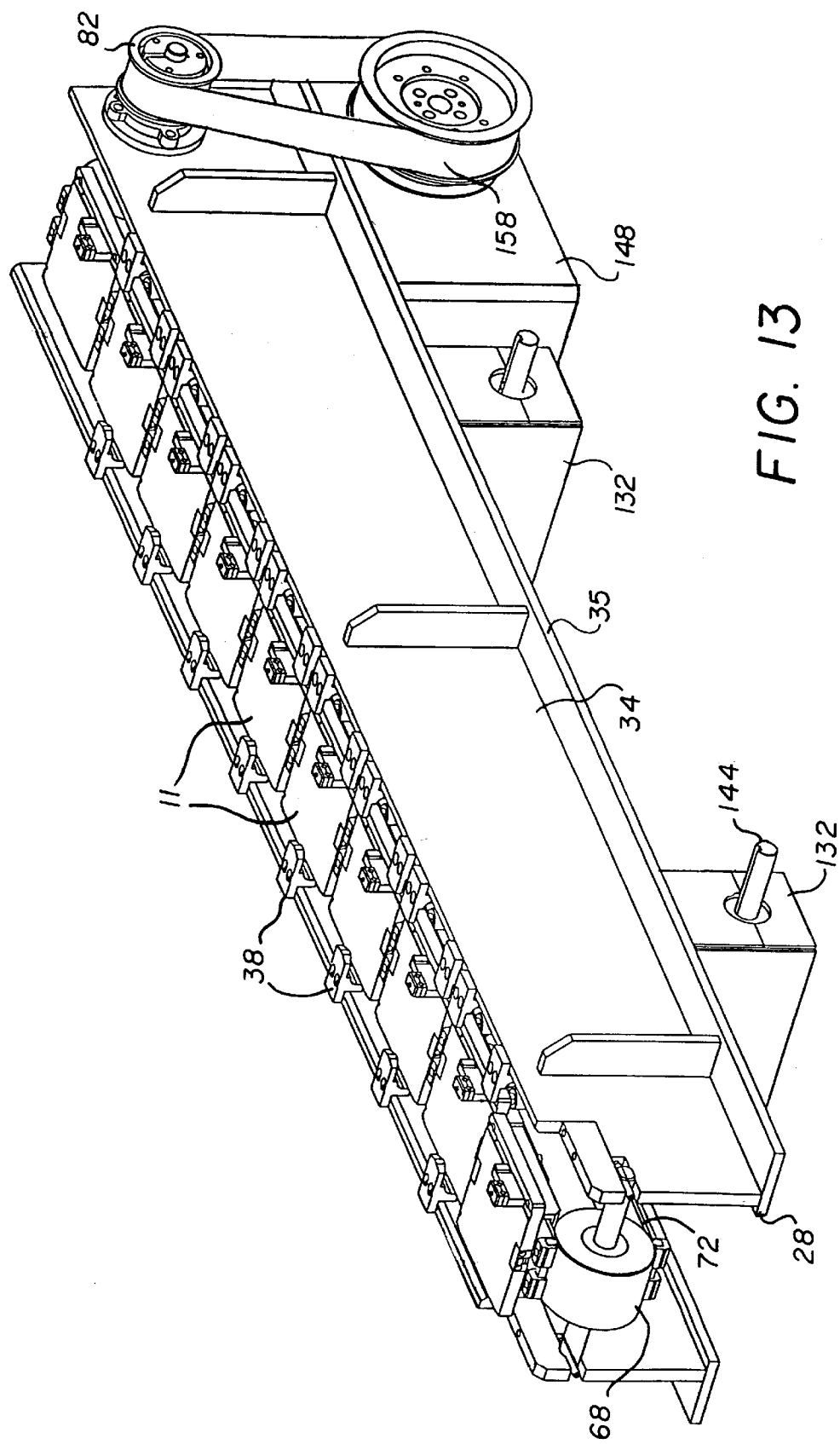
FIG. 13 is a perspective view of another embodiment of the transfer and registration apparatus. The apparatus is seen from the infeed end. Pallets are in place in all the indexing sites. The housing and infeed and outfeed conveyors are not shown. The infeed elevator is in an up position.
Figure 14:
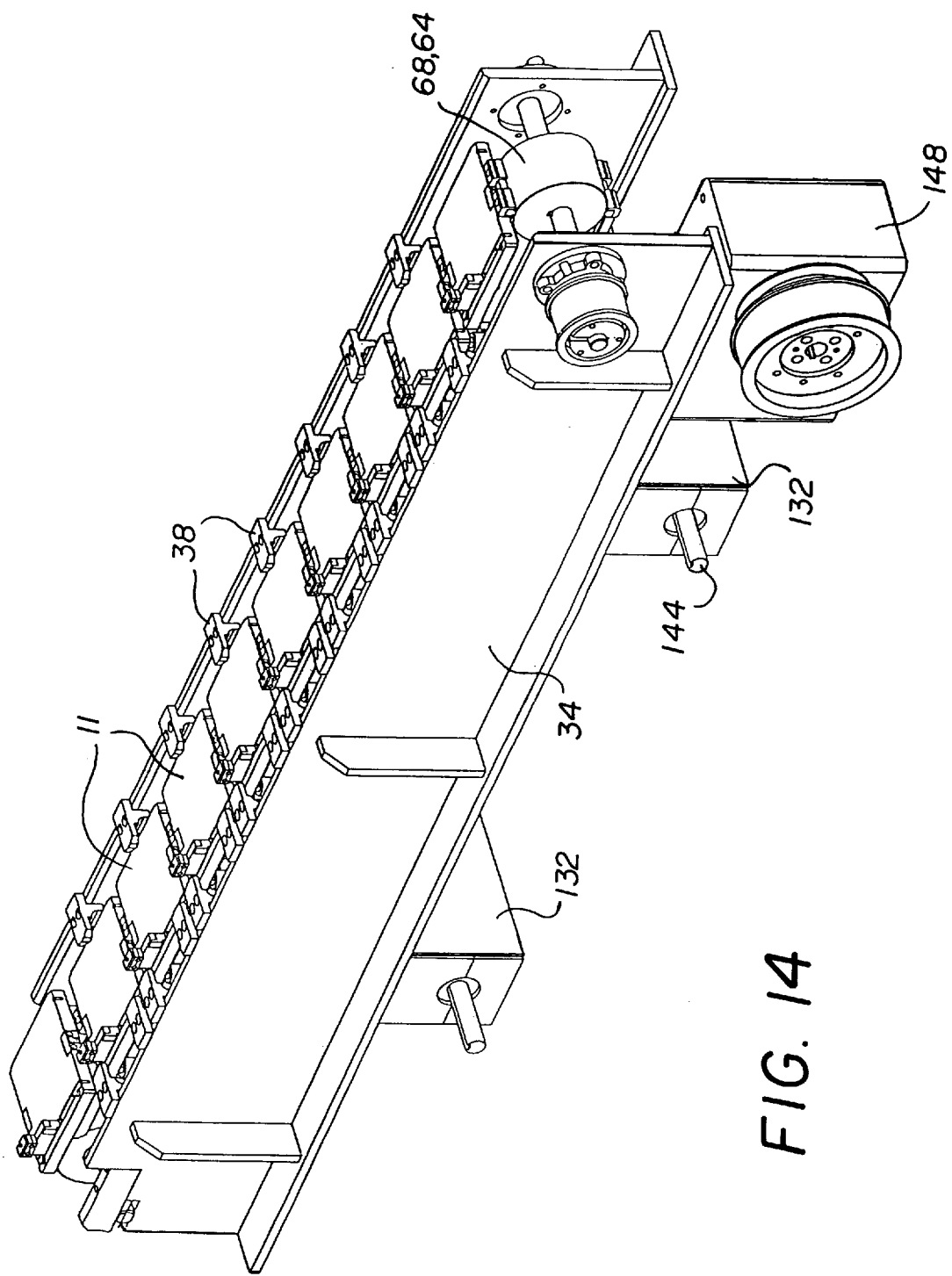
FIG. 14 is another perspective view of the apparatus of FIG. 13. The apparatus is seen from the outfeed end. Pallets are in place in all the indexing sites. The housing and infeed and outfeed conveyors and main drive belt are not shown. The infeed elevator is in an up position.
Figure 15:
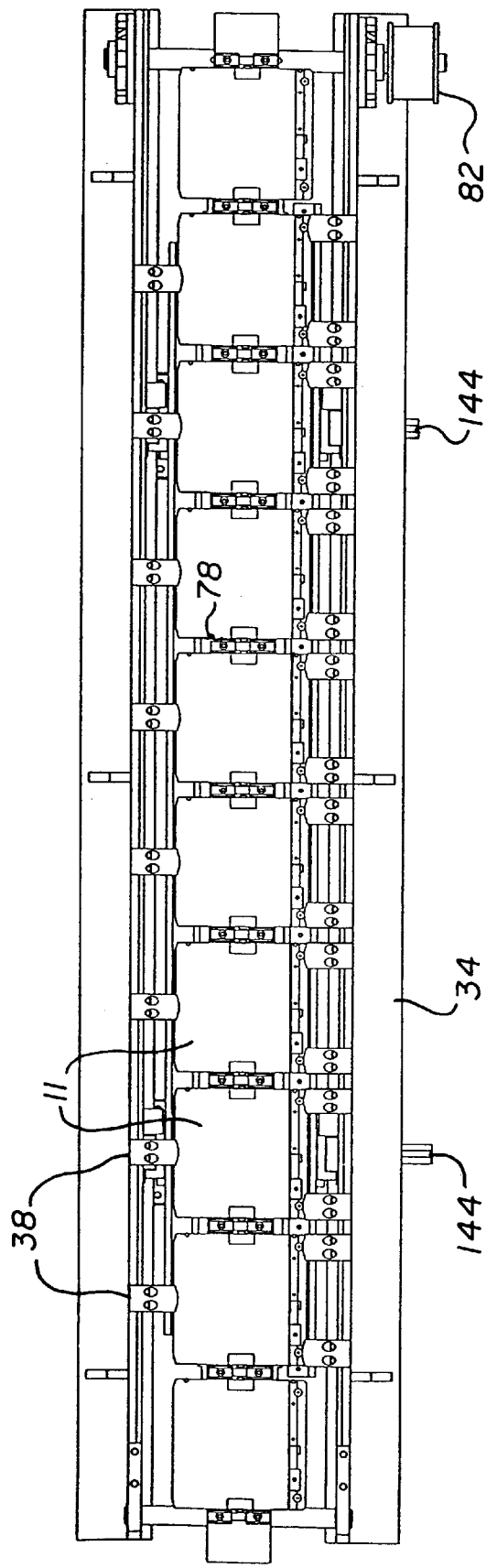
FIG. 15 is a top plan view of the apparatus of FIG. 14.
Figure 16:
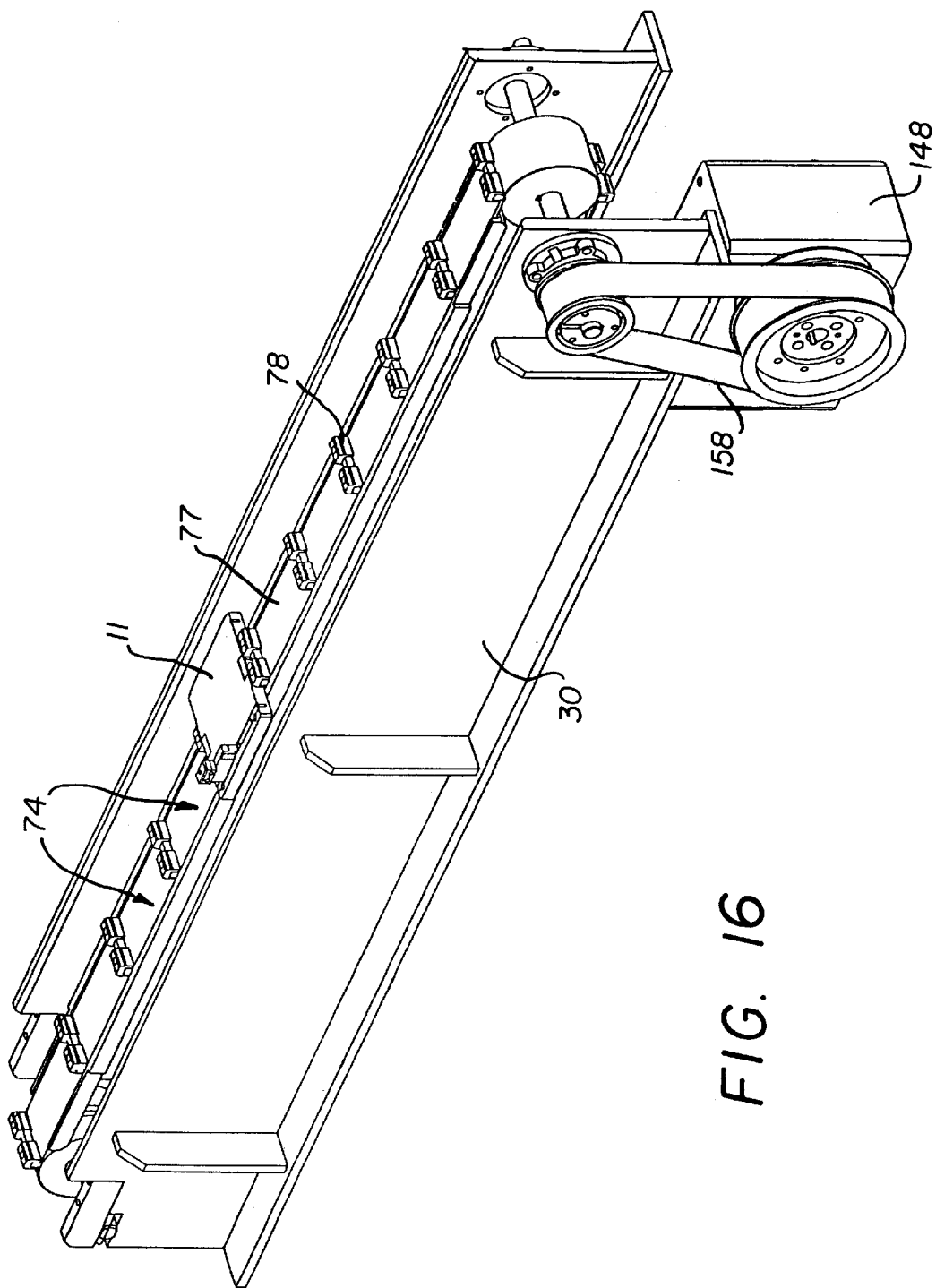
FIG. 16 is the same view as FIG. 14, but the datum units are not shown, the elevator is not shown, the belt is shown, and only one platen is present.
Figure 17:
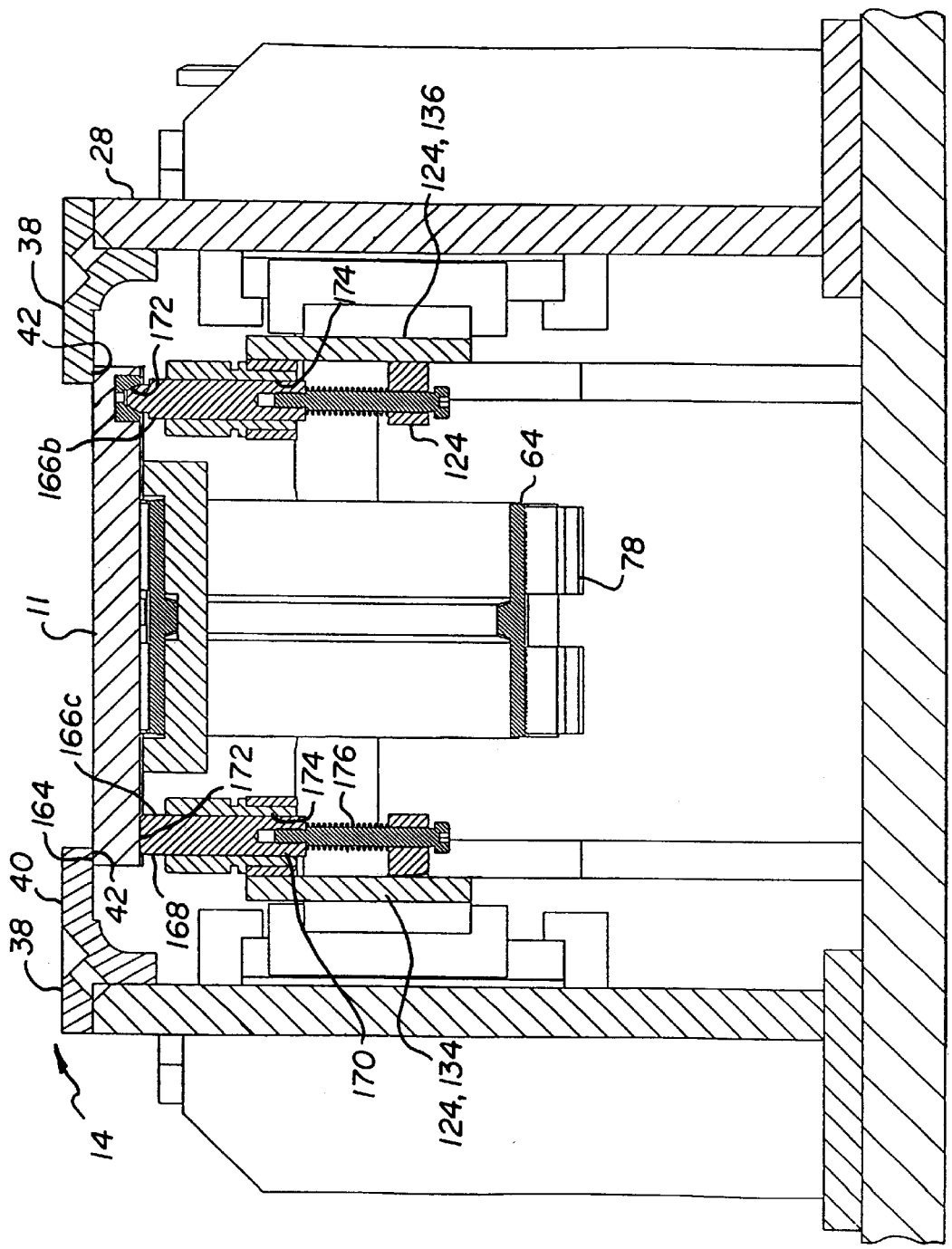
FIG. 17 is a transverse cross-sectional view of the apparatus of FIG. 13. The cross-section extends through the centers of the first and third pins of one of the locating units. An alternative pallet is in place on the locating unit. The bolster is in the raised position and the respective registering and registration faces are clamped together.
Figure 18:
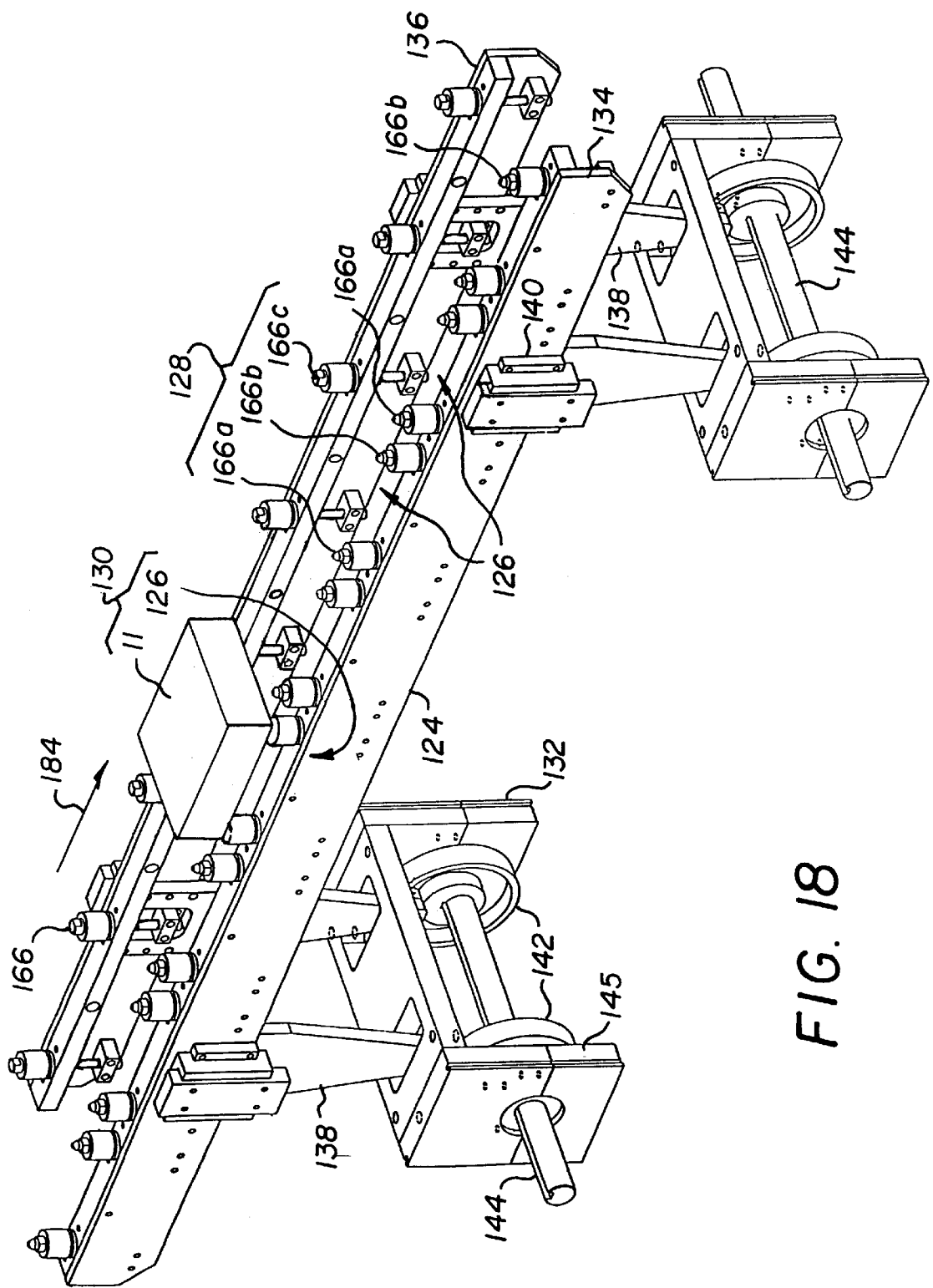
FIG. 18 is the same view as FIG. 14, except that only the locating units, bolster, and lifter are shown.

Referring particularly to FIGS. 10–11, 12A–12B, and 43, the datum units 36 also define a sequence of workstations 14. Each workstation 14 (indicated in FIG. 12A by dashed lines having long dashes) has a device space 47 (coinciding with the workstation 14, except as indicated in FIG. 12A by dashed lines having short dashes) for one or more work devices 48; a workstation indexing site 50, into which a pallet 11 is indexed during transport; and a registration site 52, which the pallet 11 occupies as work is done on the workpiece 12 by the work device 48. It is preferred that workstations 14 do not overlap and are spaced at a uniform pitch along the table 28. For simplicity, it is highly preferred that the workstations 14 are all within the main chamber 18 of the housing 16. Work devices 48 can be fully enclosed in the housing 16 or can have portions extending outward through a wall of the housing 16 (not shown) provided that adequate light blocking is present.

The work device 48, within a workstation 14, includes a tool 54 and an operating unit 55 for the tool 54. The tool 54 of each work device 48 is movable relative to the respective registration site 52 as required by a particular manufacturing process. Suitable tools 54 for assembling film bearing camera frame assemblies 12a are well known to those of skill in the art. For example as shown in FIG. 11, a pallet 11 has a first nest 56 that closely receives a camera frame assembly 12a, for a one-time use camera, in a predetermined alignment and a second nest 58 that receives a film unit 60. A first work device 48a transfers the film unit 60 into the camera frame assembly 12a and a second work device 48b prepares a filmstrip 62 of the film unit 60 for winding. (The preparation illustrated in FIG. 11 is thrusting along the camera frame assembly.) A third work device 48c then prewinds the filmstrip 62 the film unit 60 within the respective camera frame assembly 12a. Convenient work devices for this purpose are disclosed in U.S. Pat. No. 5,873,002.

The work device 48, within a workstation 14, is aligned with the registration site 52 by being aligned with the alignment surface 44 of the respective datum unit 36. In the embodiments shown in the figures, this can be done by mounting the work device 48 directly to the respective alignment face or faces 40 using bolts or other fasteners. The datum pads 38 can fully support a work device 48 or can provide partial support or can be used just to align a separately supported work device 48. It is preferred that the work devices 48 are each mounted to the table 28 in some manner.

Figure 43:
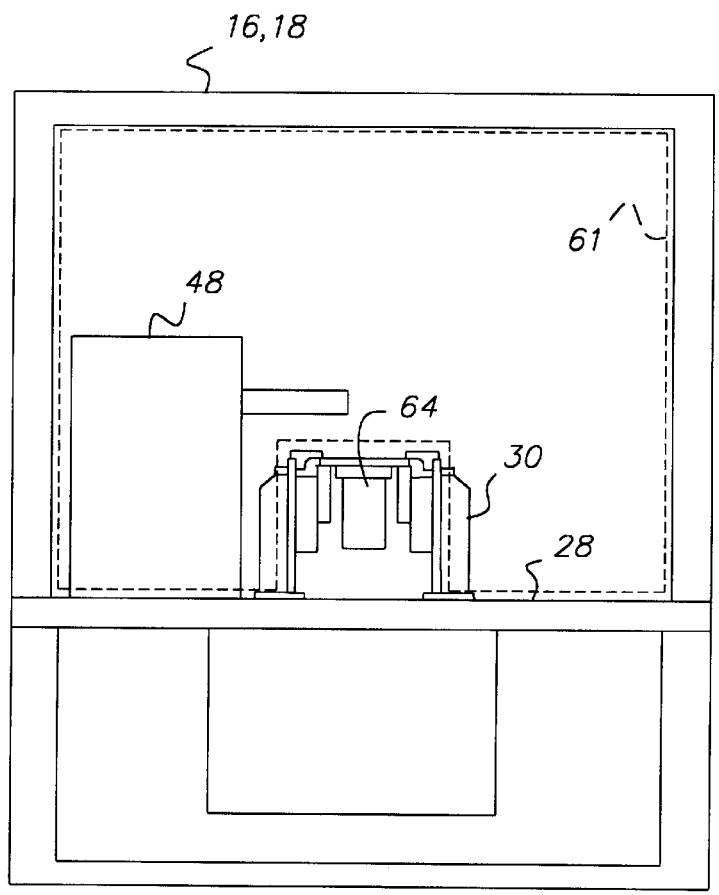
FIG. 43 is a transverse cross-sectional view of the apparatus of FIG. 13. The cross-section of an arch-shaped work device area defined by the table is illustrated by a dashed line.

A work device 48 does not have to be present in each workstation 14. For example, if a particular work device 48 is oversize, then all or part of the device space 47 of an adjoining workstation 14 can be used to provide clearance. The device spaces 47 taken together form a work device area 61. The work device area 61 extends upward and laterally outward from the datum units 36. The work device area 61 defined by the table 28 illustrated in FIG. 43 is arch-shaped and is illustrated by a dashed line. The outer boundaries of the work device area 61 are a matter of convenience or are limited to the confines of the main chamber 18 of the light-tight housing 16. Smaller work device areas 61 can be provided, if desired, by limiting work devices 48 to one of the flanges 30 of a table 28. If only one of the flanges 30 is used, then the other flange 30 can be eliminated or reduced in size, except as required for structural support. An arch-shaped work device area 61 is preferred, because this allows access by work devices from two sides and above and thus allows greater flexibility in placement of work devices 48.

Pallets 11 are moved along the table 28, from one indexing site 50 to the next, by a transporter 64. In addition to the workstation indexing sites 50, the table 28 can also have auxiliary indexing sites 66 that are not within workstations 14 and are used for other functions, such as an infeed indexing site 66a for loading pallets 11 onto the transporter 64 and an outfeed indexing site 66b for unloading pallets 11 from the transporter 64. The auxiliary indexing sites 66 are not in workstations 14 and do not have corresponding registration sites 52.

Referring now mainly to FIGS. 1–5, the transporter 64 is aligned with the table 28. The transporter 64 can be mounted to an underlying foundation or directly to the table 28. The transporter 64 occupies space only between the flanges 30 and under the surface 31 and is thus spaced from the work device area 61. The transporter 64 advances the pallets 11 longitudinally along the table 28 and incrementally past each datum unit 36. It is preferred that the transporter 64 utilizes an endless transport belt 68; however, other types of mechanism can be used, such as chains, motorized rollers, linear motors and the like, can also be used. The endless transport belt 68 is currently preferred, for the reasons that the belt 68 provides very economical use of space in the apparatus 10. This is important for preferred embodiments, since the transporter 64 has to function within the main chamber 18. The transport belt 68 is also simple and easy to maintain. For convenience, the apparatus 10 is generally described herein in terms of an apparatus 10 including a transport belt 68. It will be understood that like considerations apply to apparatus 10 having other transporters 64.

The belt 68 has a forward run 70 and a return run 72. The forward run 70 is aligned with the table 28 and is disposed between the flanges 30 of the table 28. (The return run 72 is also aligned with the table 28 in the illustrated embodiments.) It is convenient if the forward run 70 is horizontal, but other orientations can be used if appropriate holddowns (not illustrated) for pallets 11 and workpieces 12 are used. As a matter of convenience herein, the transfer apparatus 10 is described using directional terms based on a horizontally disposed forward run 70. The return run 72 of the transport belt 68 is not critical and can parallel the forward run 70 vertically, as shown in the figures, or horizontally (not shown). The vertically paralleled return run 72 is preferred for reasons of compactness. The return run 72 can also follow a more complex path, if desired. The forward run 70 advances in a direction indicated by arrow 73 from an infeed end adjoining the entry chamber 20 to an outfeed end adjoining the exit chamber 22.

The transport belt 68 has a sequence of cradles 74. Each cradle 74 is configured, when on the forward run 70, to receive a pallet 11. The pallets 11 on the cradles 74 of the forward run 70 can each carry a workpiece 12. During use, workpieces 12 can be present in each cradle 74 of the forward run 70 or some cradles 74 can be left empty.

The cradles 74 receive the pallets 11 and can be adapted to match the configuration of particular pallets 11 or a generalized configuration that can accommodate a variety of different pallets 11. For simplicity, it is generally convenient if, all pallets 11 in use on the apparatus 10 at a particular time have the same configuration.

The pitch of the transport belt 68, that is, the spacing from cradle 74 to cradle 74, matches the pitch of the indexing sites 50, the spacing from one indexing site 50 or 66 to the next. It is preferred that the cradles 74 have a longitudinal dimension, in the direction of advance of the forward run 70, that is only slightly larger than the longitudinal dimension, in the same direction, of the respective pallets 11. This minimizes the mass that must be moved and also reduces the size required for the light-tight housing 16. To further minimize length of the forward run 70, in the embodiments shown in the figures, the forward run 70 of the transport belt 68 has a length that closely matches a multiple of the length of the cradles 74 in the same direction.

Referring to FIGS. 1–5, the belt 68 has a continuous band 77 of flexible material or chain and a sequence of regularly spaced lugs 78, which delineate the cradles 74. Each lug 78 has one or more protuberances 78a, which protrude outward from the band 77. The pallets 11 rest loosely in the respective cradles 74 under the action of gravity, such that the lugs 78 butt against a longitudinal end 80 of a pallet 11 and push along the pallet 11 when the belt 68 is advanced.

In the embodiments illustrated, the pallets 11 are removable. The pallets 11 are each placed in a cradle 74 at the entry end of the forward run 70 and are taken out of that cradle 74 at the exit end. The transport belt 68 can, alternatively, have pallets that are not removable from the belt (not illustrated), or can transport workpieces that themselves incorporate non-removable pallets.

The transporter 64 defines vertically-oriented locating unit passageways 76 adjacent each of the cradles 74 in the workstations 14. The pallets 11 in the workstations 14 overlie the respective locating unit passageways 76. In the embodiments shown in the figures, a pair of rectangular passageways 76 adjoin either side of the cradles 74 in the workstations 14.

During use, the transport belt 68 incrementally steps the cradles 74, and carried pallets 11 and workpieces 12, from indexing site to indexing site along the table. A drive 82 is actuated and deactuated to move the belt 68. Timing of the actuation and deactuation can be based on any convenient means, such as mechanical switches, or sensors and a programmed electronic computer (not illustrated).

The manner of feeding the pallets 11 in and out is not critical as long as the pallets 11 can be placed in and removed from the transporter 64 at a reasonable speed and without mispositioning. The feeding can be manual or can use automated equipment. Referring to FIGS. 1–2, 9–10, and 19, in some of the embodiments shown, at the infeed and outfeed ends of the belt 68, a pallet 11 is moved onto and off of the forward run 70, respectively. A stub-conveyor 29 moves pallets from the entry chamber 20 to an entry buffer 85 within the main chamber 18 adjoining the infeed indexing station 66a. A stop 86 holds the pallets 11 back until the transporter 64 has advanced a pallet 11 out of the infeed indexing site 66a to the first of the workstation indexing sites 50 and the elevator 88 at the infeed indexing site 66a has moved to an up position.

The elevator 88 has a pair of channels 90 (most easily seen in FIG. 9) that adjoin the belt 68 at either side. The channels 90 are supported by a hoist 92 having a pair of air cylinders 94 joined in common to a source of compressed air 96. The elevator 88 is movable between an up position and a down position. In the up position, the elevator 88 is vertically aligned with the stub-conveyor 29. In the down position, the elevator 88 is below the level of the belt 68.

Referring now particularly to FIGS. 1–2, 5, 10, 19, and 33–38, a feed mechanism 98 adjoins the infeed indexing station 66a on one side and extends along part of the entry buffer 85. The feed mechanism 98 has a slider 100 that includes a chassis 102 that reciprocates parallel to the direction of pallet advance indicated by arrow 73. The slider 100 has a plow 104 that is mounted to the chassis 102 and pivotable about an axis 106 that is transverse to the pallet advance direction 73. The plow 104 is biased downward, toward the table 28 by a spring 108. The plow 104 has a forward edge 110 that is vertically aligned and parallel to the longitudinal ends 80 of the pallets 11 in the entry buffer 85 and in the cradle 74. The plow 104 has a return edge 112 that is angled diagonally upward and outward from the table 28, in a direction transverse, and preferably perpendicular, to the pivot axis 106 of the plow 104.

Figure 33:
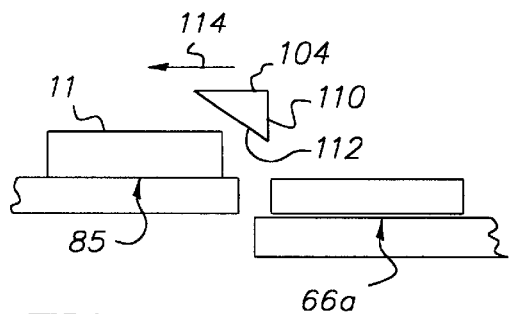
FIGS. 33–38 are diagrammatical side views of the infeed end of the apparatus of FIG. 1 and illustrate, in sequence, the movement of a pallet by the plow and elevator.
Figure 34:
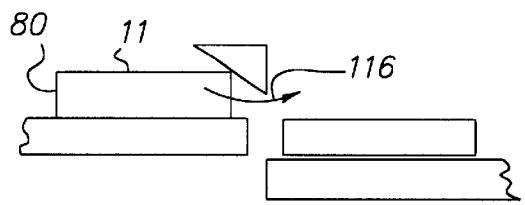
Figure 36:
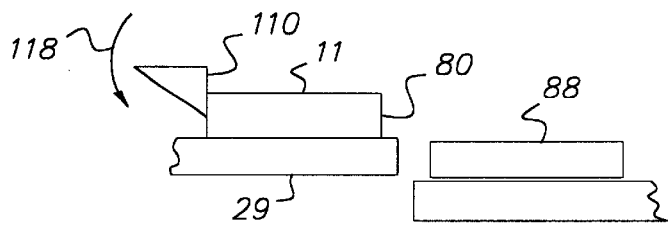
Figure 37:
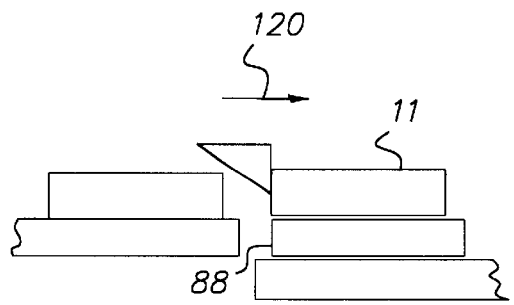
Figure 35:
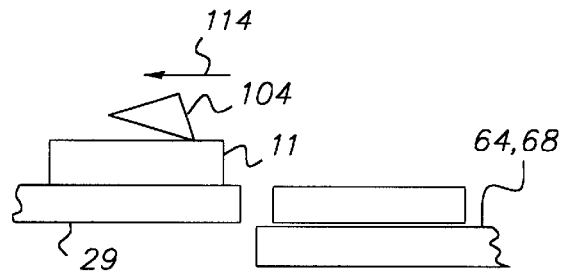
Figure 38:
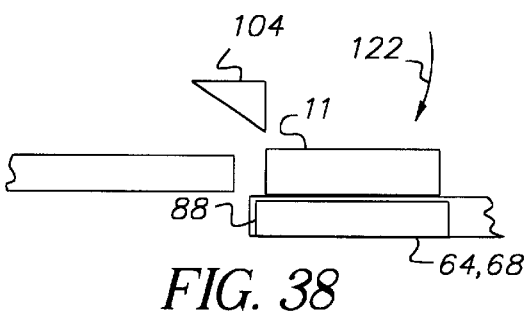
Figure 41:
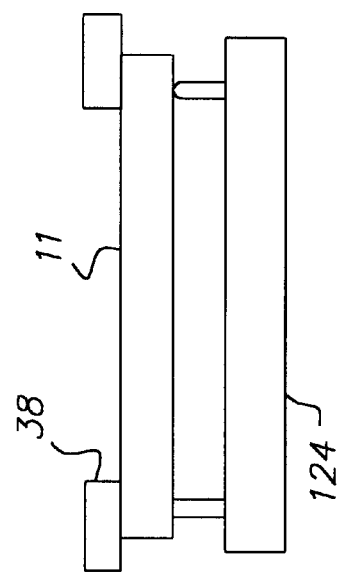
FIGS. 39–42 are diagrammatical transverse cross-sectional views of the apparatus of FIG. 13 and illustrate movement of the pallet and locating units when the bolster is moved from the lowered position, through intermediate positions, to the raised position, respectively. Some dimensions are exaggerated for clarity.
Figure 42:
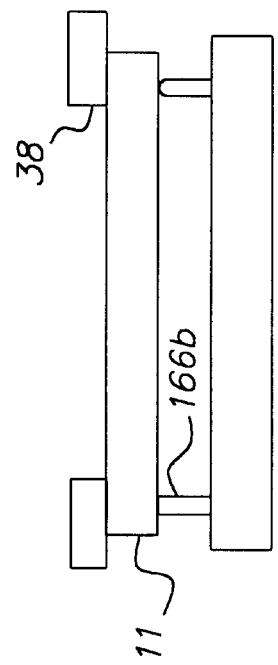
Figure 39:
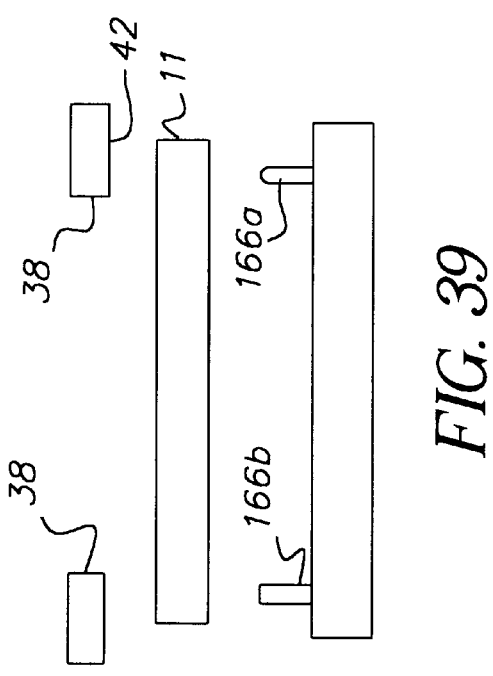
Figure 40:
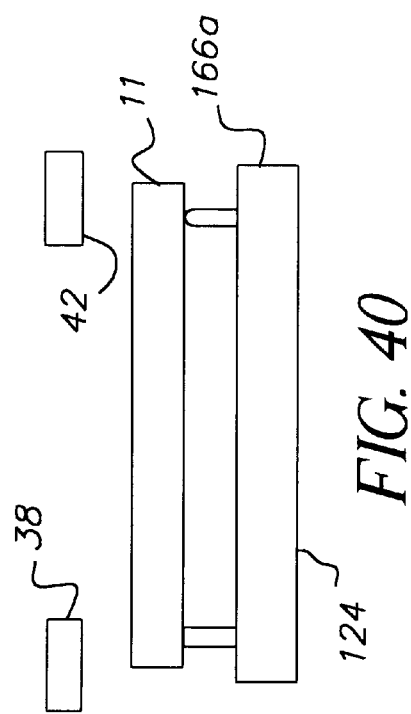

Referring now particularly to FIGS. 2 and 33–38, when the transporter 64 has advanced a pallet 11 out of the infeed indexing site 66a to the first of the workstation indexing sites 50 and the elevator 88 has moved to the up position, the stop 86 is retracted and the plow 104 is moved, in the direction of arrow 114 in FIG. 33, from an inward position adjoining the infeed indexing site 66a to an outward position adjoining the entry buffer 85. The plow 104 enters the entry buffer 85 and the return edge 112 comes into contact with the waiting pallet 11. The plow 104 pivots about axis 106 in the direction indicated by arrow 116 in FIG. 34. The plow 104 is moved through the entry buffer 85 with the return edge riding on the pallet 11, as indicated in FIG. 35, until the forward edge 110 passes the outward longitudinal end 80 of the pallet 11. The plow 104 then rotates in the direction of arrow 118 in FIG. 36 and the forward edge 110 of the plow 104 comes into contact with the outer longitudinal end 80 of the pallet 11. The plow 104 is then moved back toward the table in the direction of arrow 120 in FIG. 37. The pallet 11 is pushed onto the elevator 88 and the elevator 88 is lowered in the direction of arrow 122 in FIG. 38 until the pallet 11 rests on the belt 68.

Figure 5:
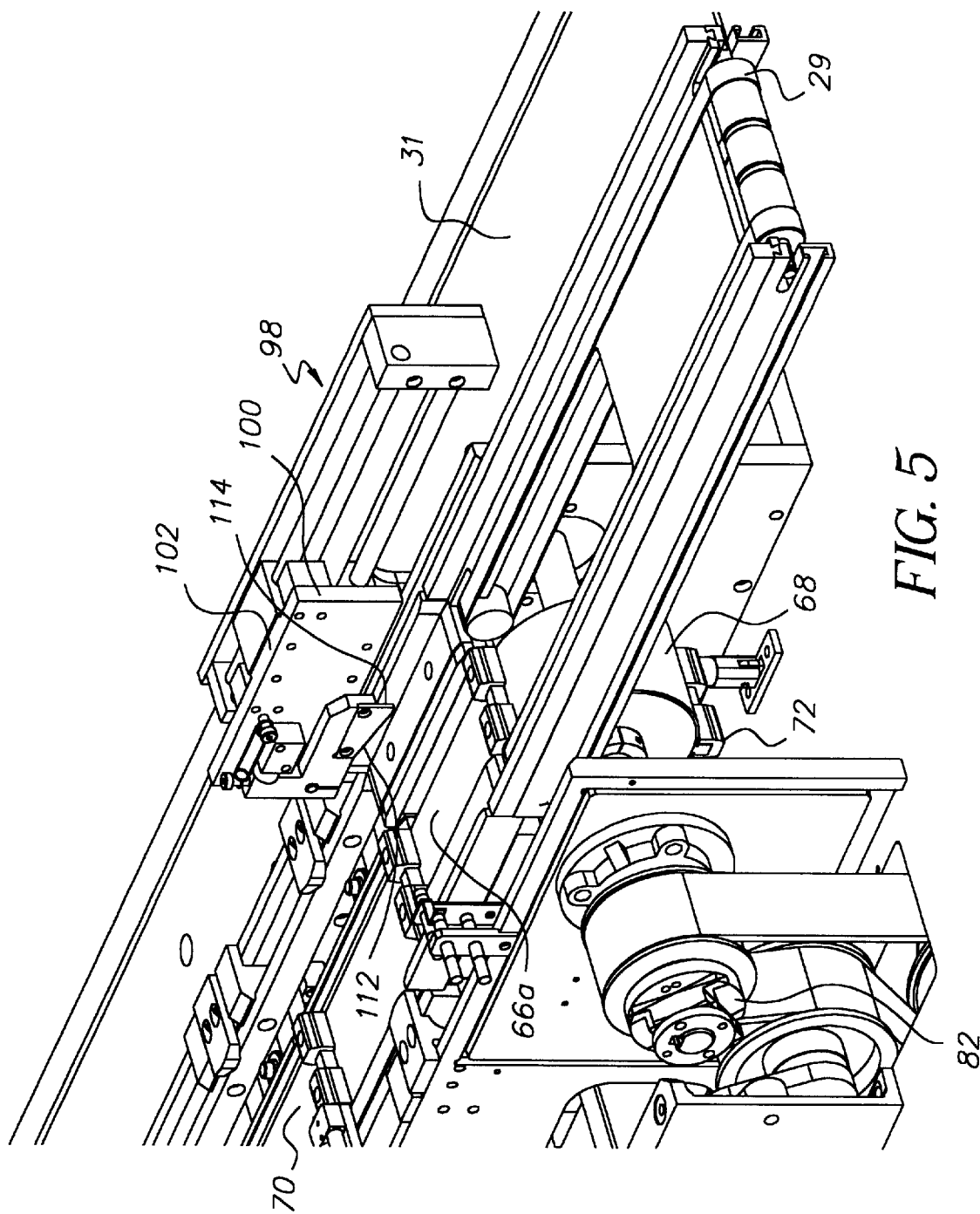
FIG. 5 is a partial enlargement of the outfeed end of the apparatus of FIG. 1.

Referring now to FIGS. 5 and 10, the apparatus 10 has an elevator 88 and feed mechanism 98 adjoining the outfeed indexing site 66b that are structured and operate in the same manner as the elevator 88 and feed mechanism 98 at the infeed indexing site 66a.

Referring now particularly to FIGS. 1, 10–12B, and 17–19, an elongate bolster 124 is mounted in alignment with the workstations 14 of the table 28 and with the transporter 64. The bolster 124 has a series of bolster segments 126 aligned with individual workstations 14. A locating unit 128 is disposed between each bolster segment 126 and the respective pallet 11. The bolster segment 126 and pallet 11 temporarily associated with an individual locating unit 128 are also referred to collectively herein as a "bolster segment-pallet pair". The bolster 124 is joined to a lifter 132 which reciprocates the bolster segment-pallet pairs 130 between a lowered position and a raised position relative to the datum units 36 of the table 28. The bolster 124 lifts pallets 11, within workstations 14, from indexing sites 50 to registration sites 52. The pallets 11 in the workstation indexing sites 50 are all lifted, held in position, and lowered by the bolster 124 simultaneously. The bolster 124 is rigid, such that the movement of the bolster 124, and lifted pallets 11, is the same for all the bolster segments 126. The length of the bolster 124 and the number of workstation indexing sites 50 present can be varied, subject to practical limitations, such as available space, and the mass of the bolster 124. Eight intermediate indexing sites 50 are illustrated in FIG. 1. The bolsters 124 shown in the figures are used with linear transporters. Bolsters 124 and transporters can be curved or circular; however, linear transporters 64 and bolsters 124 have the advantages of maximizing available space for work devices 48 on both sides of the table 28 and providing workstations 14 that are rectangular in outline rather than sector-shaped.

The bolster 124 and the lifter 132 are configured such that the relative positions of the table 28 and the bolster 124, are precise within predetermined tolerances and are accurately reproduced during each reciprocation of the bolster 124. Within these limitations, the path of the bolster 124 is not critical. For simplicity, it is preferred that the reciprocation of the bolster 124 is an up-and-down motion in the direction perpendicular to the direction of pallet travel. This kind of motion is preferred, because required mechanical components are relatively simple and close tolerances are relatively easy to obtain. The bolster 124 is not, however, limited to vertical movement. The bolster 124 could move horizontally rather than vertically or in some other direction, or could rotate about a fixed axis toward and away from the datum units 36, or could move vertically and simultaneously rotate about one or more axes (not illustrated). These alternatives would very likely add complexity. For example, non-vertical movements would likely necessitate holddowns, rather than gravity, to keep pallets in place.

The bolster 124 is mounted under the forward run 70 of the transport belt 68. The bolster 124 is shaped to accommodate the spatial constraints imposed by the table 28 and the transport belt 68. In the embodiments shown in figures, the bolster 124 has a pair of spaced apart right and left rails 134,136. Each rail adjoins a respective flange 30 of the table 28. The rails 134,136 may or may not be directly joined together. In the embodiments shown, the rails 134,136 are not directly joined to each other, but are aligned in fixed geometric relation to each other and mechanically coupled together to move only in tandem.

The bolster 124 is moved between the lowered and raised positions, intermittently in synchrony with the movement of the cradles 74 of the transport belt 68. The transport belt 68 is actuated and the pallets 11 are transported to indexing sites 50 within workstations 14. The transport belt 68 is stopped and the bolster 124 is raised lifting the pallets 11. Work is performed on the workpieces 12. The bolster 124 is then lowered letting down the pallets 11. The transporter 64 is again actuated, stepping the pallets 11 forward to the succeeding indexing sites 50, and the process continues.

The lifter 132 moves the bolster 124. A variety of different types of lifters 132 can be used, subject to the limitation that the bolster 124 is moved as a unitary structure. For example, the lifter 132 can have a set of linear motion devices such as solenoids linked by a computerized control, or a set of commonly controlled hydraulic or pneumatic cylinders.

A mechanical lifter 132 is currently preferred. This lifter 132 has the advantage of being relatively simple to set up and use, and very robust. The lifter 132 has two pair of lift arms 138. The number of pairs of lift arms 138 used is a matter of convenience and the support. Each lift arm 138 has one end joined to a respective rail 134 or 136. Members of each pair 138 are joined to right and left rails 134,136, respectively. Each lift arm 138 is slideably joined to the table 28 at a slide bushing 140 (only the movable portion of slide bushing 140 is shown) and is able to reciprocate relative to the table 28 in the same manner as the bolster 124. The term "bushing" is used herein broadly to refer to mechanical supports and is inclusive of both traditional bushings and also of bearings and other types of support. The slide bushings 140 are aligned with the table 28 and are preferably mounted to the table 28. The other end of each lift arm 138 is supported on an eccentric 142. The eccentrics 142 are oval wheels that are all aligned with each other. The eccentrics 142 for each pair of lift arms 138 are coaxial and are fixed to a common axle 144. The axles 144 are mounted in rotary bushings 145 aligned with and, preferably mounted to, the table 28.

Synchronization of the lifter 132 and bolster 124 with the transport belt 68 can be provided by a controller including sensors and a microprocessor (not shown), or mechanically, or by other means. For example, servomotors could be used to provide the movements, with synchronization and control provided by a microprocessor or the like. Suitable components, including gear trains, power sources, and motion transfer devices are within the knowledge of those of skill in the art.

Figure 19:
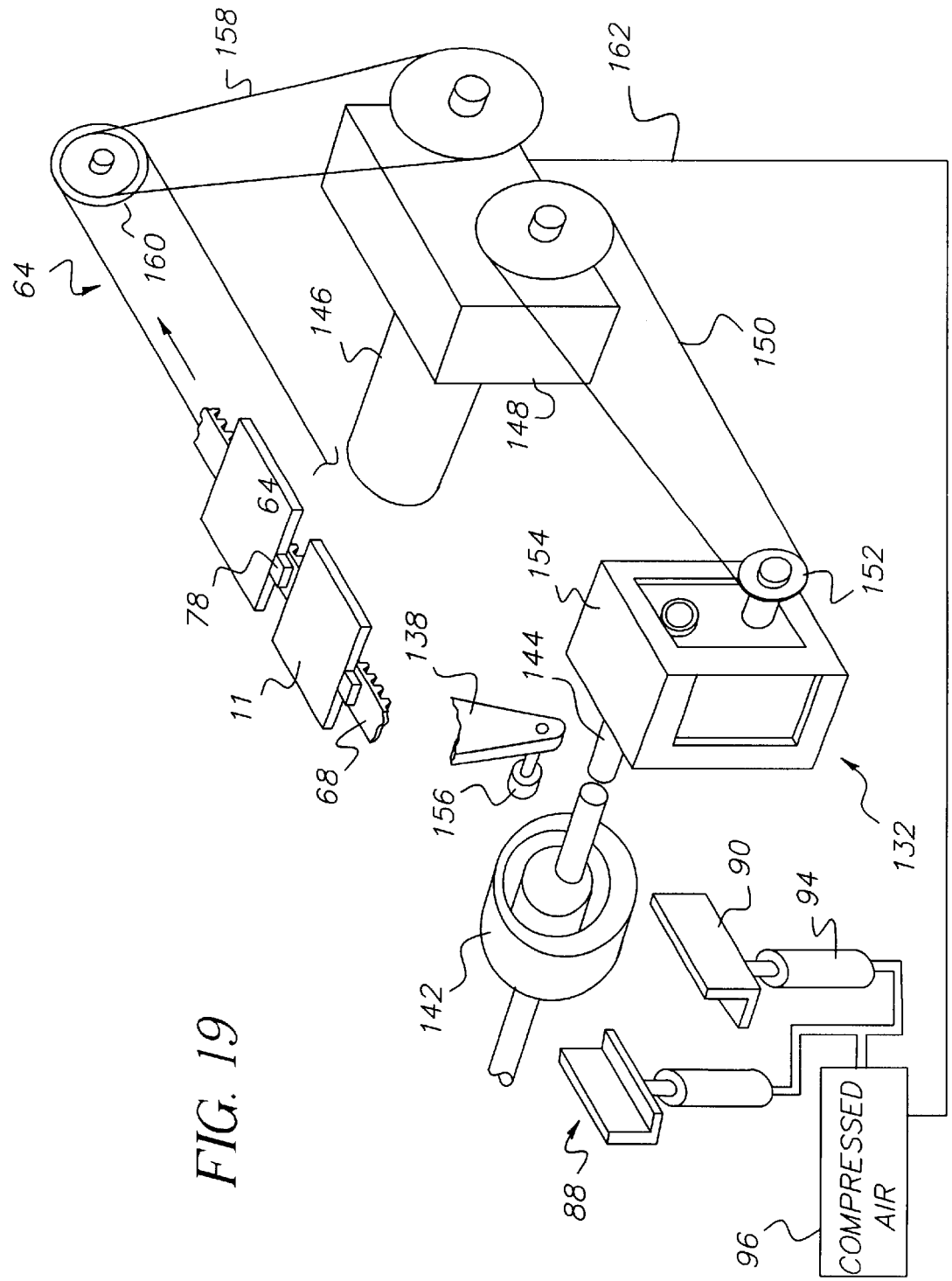
FIG. 19 is a schematic illustrating the mechanical coupling of the transporter and lifter.

In the embodiment shown in the figures, synchrony between the transport belt 68 and the bolster 124 is provided by mechanical coupling. As shown in FIG. 19, a power source 146, such as an electric motor, drives a indexer 148. A toothed belt 150 connects the indexer 148 to a sprocket wheel 152 on the lifter 132. The sprocket wheel 152 drives one of the axles 144, directly or through a gear unit 154. A pair of the eccentrics 142 are joined to the axle 144 and rotate with the axle 144. Lifter arms 138 can ride directly on respective eccentrics 142 or can be supported on rollers 156. The other axle 144 can be driven by a second toothed belt 150 and sprocket 152 (not shown in FIG. 19).

Another toothed belt 158 connects the indexer 148 to a first rim of double sprocket 160 of the transporter 64. Double sprocket 160 has a second rim that is meshed with teeth of the belt 68.

There is a signal path 162 between the indexer 148 and the compressed air source 96, which causes the compressed air source 96 to move the elevator channels 90 in synchrony with the stepped advancements of the transporter 64. The nature of the signal provided on the signal path 162 is not critical and can be, for example, electrical or mechanical or pneumatic. The elevator can also be mechanically driven by an eccentric-axle-gear train mechanism like that described above in relation to the lifters.

Referring now to FIGS. 20–28 and 39–42, as the bolster 124 is moved out from the lowered position, the pallets 11 are lifted out of respective cradles 74, to a series of intermediate positions, and then to the raised position. In the lowered position, the pallets 11 are each fully supported by a respective cradle 74 of the transporter 64. In the intermediate and raised positions, the pallets 11 are supported by the respective locating units 128, which are supported, in turn, by the respective bolster segments 126.

The locating units 128 are ganged, that is, the locating units 128 are positioned on the bolster 124 to act concurrently on the pallets 11 in the workstations 14. The locating units 128 orient the pallets 11, in two or more directions relative to the bolster 124, as the pallets 11 are lifted. In the raised position, the locating units 128 clamp registering faces 164 of the pallets 11 against the respective registration faces 42. When the bolster 124 is in the raised position, the pallets 11 each define the registration sites 52 within the workstations 14. The registration sites 52 have predetermined spatial relationships to the respective datum units 36 and aligned work devices 48.

The registering faces 164 are disposed opposite the locating units 128; in the embodiments shown in the Figures, on the top sides of the pallets 11. The registering faces 164 are spaced from the registration faces 42 of the datum pads 38 until the pallets 11 enter the raised position. Each registering face 164 is shaped to closely seat against the respective registration face 42 and is preferably complementary in shape. As with the registration surfaces 46, it is preferred that the registering faces 164 are flat and are uniform from pallet to pallet.

The locating units 128 each have one or more support members or pins 166. The pins 166 protrude upward relative to the top of the bolster 124 and downward relative to the pallets 11. It is preferred that the pins 166 are small and that three are used. With a bolster 124 having a pair of rails 134,136, it is preferred that pins 166 are provided on each of the rails 134,136.

The pins 166 each have a free end 168 and a mounted end 170. The mounted ends 170 are joined to mounts 174 of a respective segment 126 of the bolster 124. The free ends 168 engage sockets 172 of respective pallets 11. The bolster segment 126 and pallet 11 temporarily associated with an individual locating unit 128 define a bolster segment-pallet pair 130 that includes sockets 172 for the free ends 168 and mounts 174 for the mounted ends 170 of the pins 166 of the locating unit 128. The mounted ends 170 are joined to the mounts 174 so as to not disjoin when the pallets 11 are removed. The pins 166 can be permanently mounted in the mounts 174, but are preferably mounted, by use of engaged threads (not shown) or the like, so as be easily replaceable when worn. The free ends 168 engage and are freely removable from the sockets 172. Some or all of the mounts 174 can be provided in the pallets 11, but it is generally preferred that the mounts 174 are provided in the bolster 124 and the sockets 172 in the pallets 11, since pins 166 joined to pallets 11 have a greater likelihood of suffering damage during use than pins 166 joined to the bolster 124.

It is preferred that locating units 128 are biased in an outward direction from the respective pallet 11 or bolster segment 126 or both. The biasing reduces stresses on the pallets 11 and datum units 36, when they 11,36 are clamped together. It is also highly preferred that the pins 166 of the locating units 128 are biased outward from the respective registering faces 164. This outward biasing allows time for pins 166 to move against respective mounts 174 before the registering and registration faces 164,42 lock together. In other words, each pallet 11 starts in a lowered position, in which the registering face 164 of the pallet 11 and the registration face 42 of the respective datum unit 36 are spaced apart and the respective said pins 166 and sockets 172 are loosely engaged or, preferably, spaced apart. The weight of the pallet 11 is borne by the cradle 74. The pallet 11 is moved by the bolster 124 toward the datum unit 36. The pallet 11 enters and moves through a first intermediate position, in which the registering face 164 and registration face 42 are spaced apart and the sockets 172 rest freely on respective pins 166, with the weight of the pallet 11 borne by the bolster 124 rather than the cradle 74. The pallet 11 is then moved by the bolster 124 through a second intermediate position, in which the respective sockets 172. and pins 166 are pressed together in partial counteraction of the resilient biasing. The pallet 11 is next moved into a raised position. The registering face 164 and registration face 42 come into contact and are then clamped together. This immobilizes the pins 166 relative to respective sockets 172. It is highly preferred that the clamping force be applied to the pallet 11 solely through the pins 166, as opposed to separate clamping members. This ensures that positioning of the pallet 11 on the pins 166 during movement into the raised position is not lost as the clamping force is applied. Biasing can be provided by a single resilient member (not shown) shared by the pins 166 of the locating unit 128 or individual springs 176 can be provided for each of the pins 166. Mechanical springs 176 are simple, but other kinds of springs 176 can be used, such as air springs or blocks of elastomer.

The locating units 128 each have first, second, and third pins 166a,166b,166c. The bolster segments 126 and pallets 11 have corresponding first, second, and third mounts 174a, 174b,174c, and sockets 172a,172b,172c, all respectively. The mounts 174a, 174b, 174c define parallel mount axes 180a,180b,180c. For convenience the first, second, and third pins 166a,166b,166c and respective first, second, and third mounts 174a, 174b, 174c or first, second, and third sockets 172a, 172b, 172c are sometimes referred to as "pin-mount pairs" and "pin-socket pairs". A first pin-mount pair 171 a includes a first pin 166a and the respective first mount 174a. Second and third pin-mount pairs 171b and 171c include second and third pins 166b,166c and second and third mounts 174b,174c, all respectively. A first pin-socket pair 173a includes a first pin 166a and the respective first socket 172a. Second and third pin-socket pairs 173b and 173c include second and third pins 166b,166c and second and third sockets 172b,172c, all respectively. In a pin-socket pair, the pin and socket referred to are in engagement and descriptions of the pin-socket pair may not be applicable to the respective pin and socket when not engaged.

Two of the pins 166 of each locating unit 128 are mounted to the left rail 134 of the bolster 124. The other pin 166 of each locating unit 128 is mounted to the right rail 136 of the bolster 124. When the bolster 124 is in the lowered position, the pins 166 are joined to the mounts 174, facing the forward run 70 of the belt 68, and are spaced from the respective pallets 11. As the pallets 11 are lifted out of the cradles 74, the pins 166 protrude through the locating unit passageways 76 and the free ends 168 of the pins 166 move against the respective sockets 172, under the action of gravity.

As illustrated, the mounted ends 170 of the pins 166 are slideably retained within bores 178 in the bolster 124. The pins 166 are constrained from lateral movement by the respective mounts 174 and are limited to rotation. about and linear movement along mount axes 180 which are parallel to directions of movement of the bolster 124 between the raised and lowered positions. Individual springs 176 are disposed in the bores 178 below the pins 166 and bias the pins 166 outward along the mount axes 180 toward the respective pallets 11 and datum units 36.

The sockets 172 have upwardly sloping surfaces that are define openings that are larger than the free ends of the pins 166. The free ends 168 of the pins 166 ride along the corresponding sockets 172 orienting the pallets 11 when the bolster 124 is raised and the pins 166 engage the respective sockets 172. There is a vertical overlap between pins 166 and respective sockets 172 in the lowered position. The transporter 64 transports the pallets 11, such that this vertical overlap is provided when the pallets are in the lowered position. The dimensions and movement of the transporter 64 are much less precise than the dimensions of the locating units 128 and datum units 36 and the movement of the bolster 124. There is an advantage here. The datum units 36 do not move during use. The locating units 128 and bolster 124 only move linearly, up and down. The transporter 64 moves in a more complex manner than the other components and is more likely to exhibit wear, but a large amount of wear can be accommodated before the functionality of the transporter is degraded.

In particular embodiments of the invention, the free ends 168 of the pins 166 and the degrees of freedom of each pin-socket pair 173a,173b,173c differ. In those embodiments, the first pin 166a has a hemispherical tip 186. The first socket 172a is conical or cup-shaped and, preferably, has equal dimensions along the a cross-track axis 182 and a travel axis 184. In the embodiment shown in FIG. 20, the socket is shaped like a cone joined to a narrow cylinder at its apex. The size of the first pin 166a relative to the first socket 172a can vary; with the largest being that the first pin 166a and first socket 172a are fully complementary and the smallest being that the first pin 166a comes to a point. (A pointed first pin 166a is usable, but ephemeral, since the point quickly wears into a hemisphere.)

In those embodiments, the free end 168 of the first pin 166a obstructs the first socket 172a from translating along orthogonal cross-track and travel axes 182,184 that are perpendicular to the mount axis 180. (Mount axes 180 are referred to individually herein. "Travel axis 182" and "cross-track axis 184" refer, in each case, to any of a series of parallel axes extending in the same directions. The first socket 172a is unobstructed for rotation about the first mount axis 180a, with the free end 168 in engagement with the first socket 172a. The first socket 172a is also unobstructed for rotation about the cross-track and travel axes 182,184 through a hemisphere centered on the first mount axis 180a, while in engagement with the first pin 166a.

Figure 20:
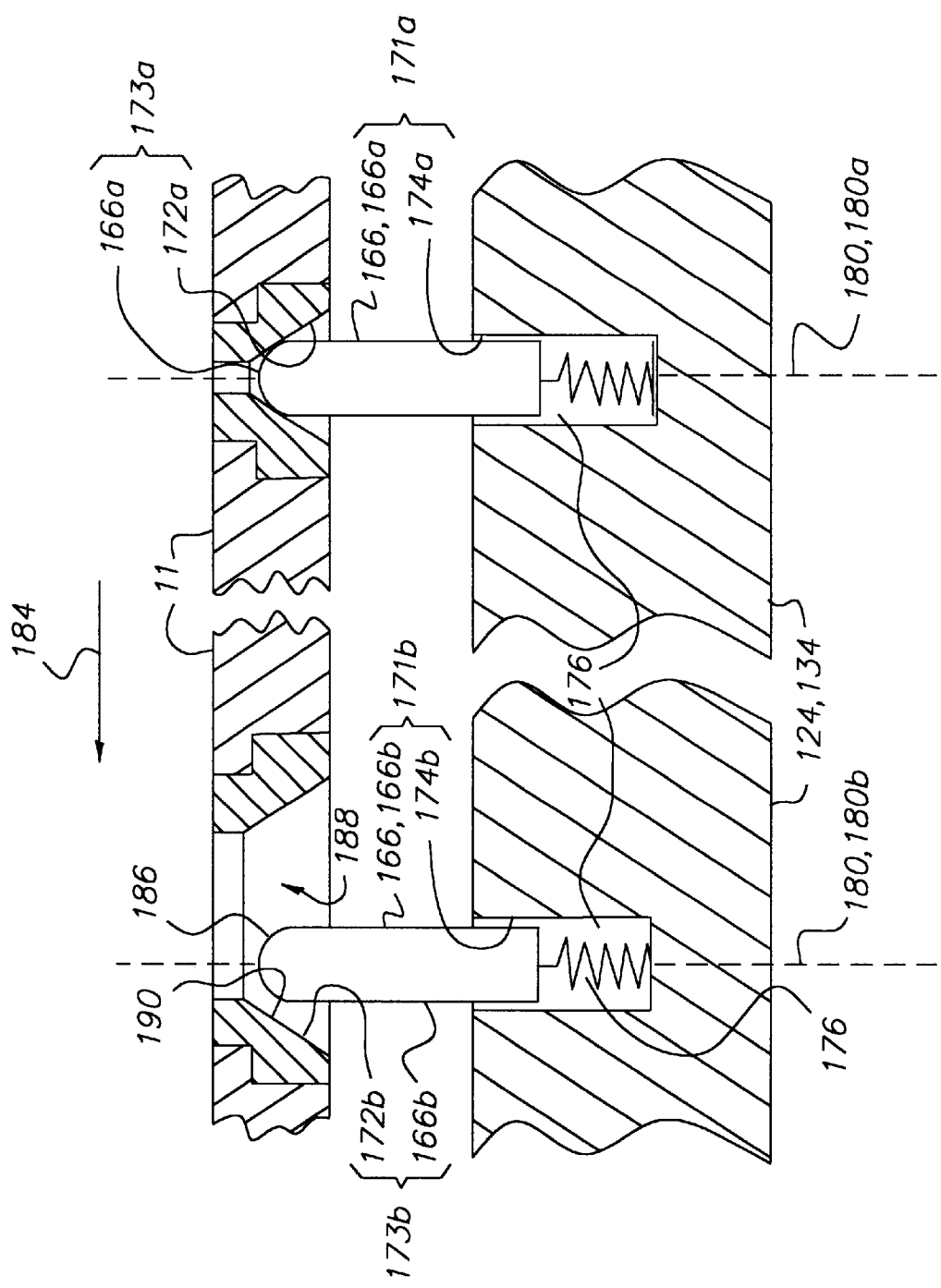
FIG. 20 is a partial cross-sectional view of a pallet and the first and second pins of a locating unit of the apparatus of FIG. 13, during initial movement of the bolster out of the lowered position.
Figure 21:
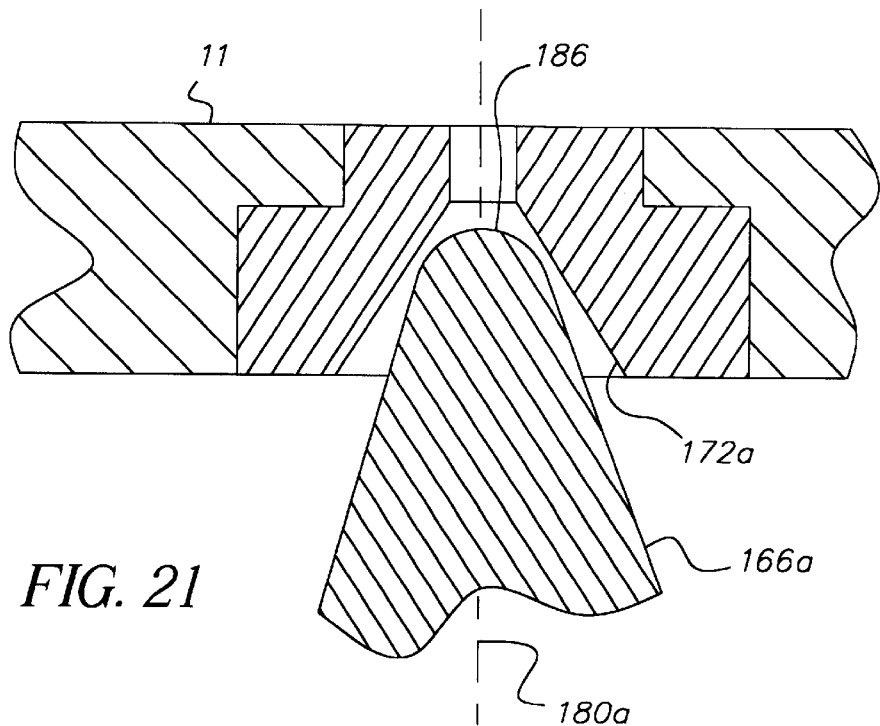
FIG. 21 is the same view as FIG. 20 of another embodiment of the apparatus, showing the first pin of a locating unit and the respective first socket of the pallet.

The second pin 166b can have the shapes discussed above for the first pin 166a. The shapes of the first and second pins 166a,166b can be the same or different. The second socket 172b is an elongate, trough-shaped notch. In the embodiments shown in FIGS. 20 and 23–25, the notch has a rectangular opening 188 and walls 190 sloped to the same degree as the conical wall of the first socket 172a. The second socket 172b can conveniently have the same transverse cross-section as the first socket, as shown in FIG. 20. The second pin 166 and the width dimension of the second socket 172b are sized and shaped so as to accommodate the second pin 166b in the second socket 172b in the same manner as with the first pin 166a and first socket 172a. The length dimension is large enough to allow relative translation of the second pin 166 along the second socket 172b. This accommodates variations in first to second socket dimensions from pallet to pallet.

The second socket 172b is obstructed by the free end 168 of the second pin 166b from translating in a direction parallel to the width of the second socket 172 and is unobstructed to translational repositioning in a direction paralleling the length of the second socket 172b, within the limits of the ends of the second socket 172b. The second socket 172b is unobstructed for rotation about the second mount axis 180b and about the cross-track and travel axes 182,184 through a hemisphere centered on the second mount axis 180b, while in engagement with the second pin 166b.

Figure 22A:
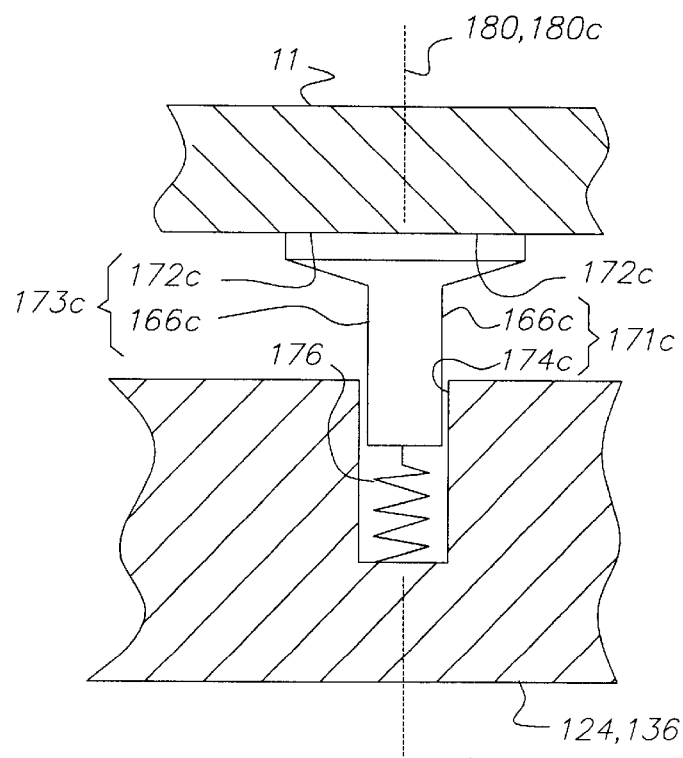
FIG. 22A is a partial cross-sectional view of another embodiment of the invention, showing the third pin of a locating unit and the respective third socket of the pallet.
Figure 22B:
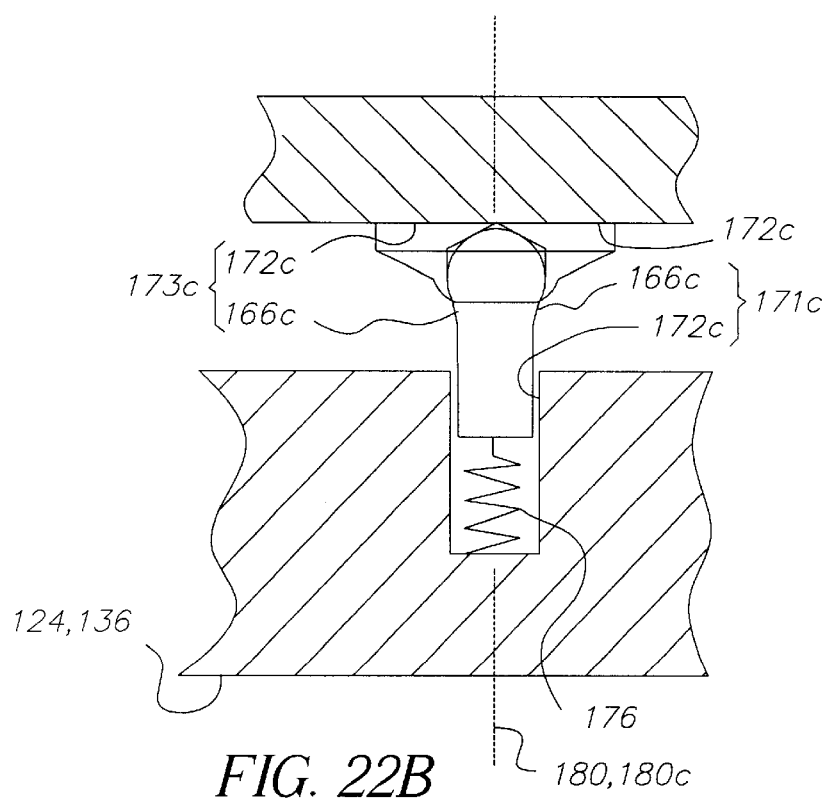
FIG. 22B is the same view as FIG. 22A of still another embodiment of the invention.
Figure 23:
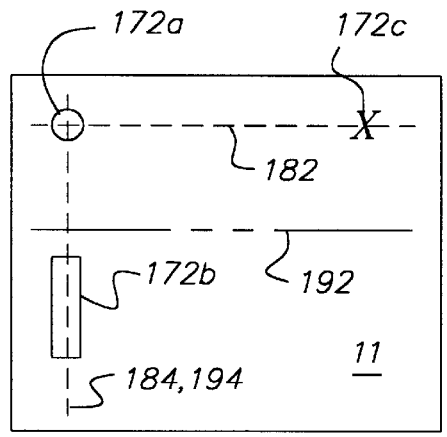
FIGS. 23–28 are diagrammatical top view of alternative pallets of the apparatus.
Figure 26:
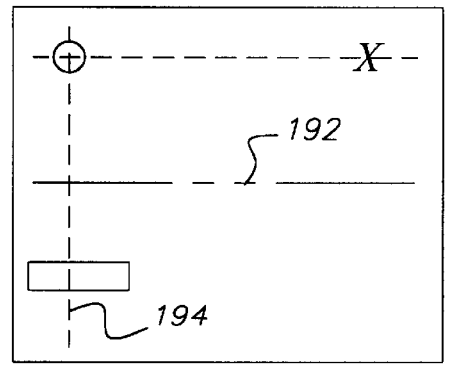
Figure 24:
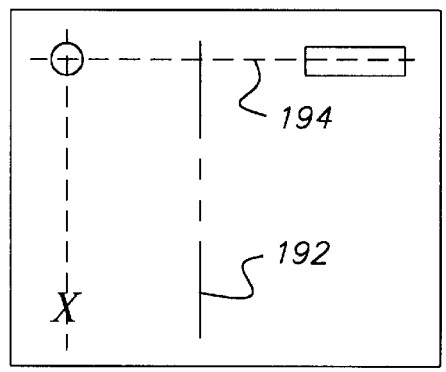
Figure 27:
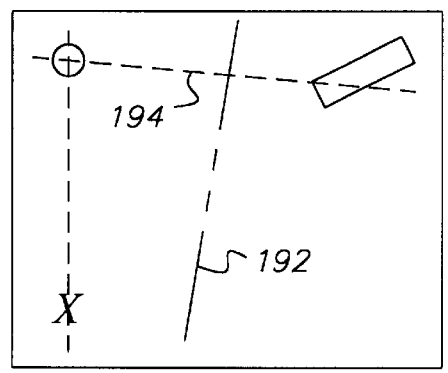
Figure 25:
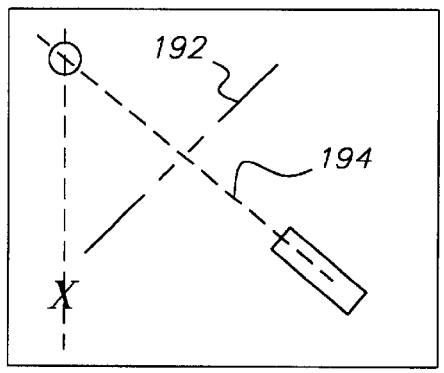
Figure 28:
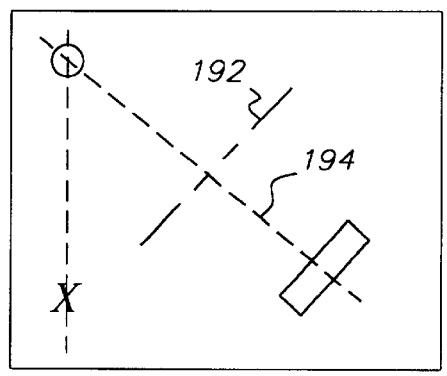

Referring now particularly to FIGS. 20–28, the first and second pin-socket pairs 173a,173b are spaced apart and thus block rotation of a pallet 11 about an axis 192 extending perpendicular to a line 194 connecting the centers of the two pin-socket pairs 173a,173b. Rotation of the pallet 11 about the line connecting the centers of the two pin-socket pairs 173a,173b is not blocked. In the embodiments shown in FIGS. 23–24 and 26 the line connecting the two pin-socket pairs 173a,173b parallels the travel axis 184 or the cross-track axis 182, respectively; and rotation about one of the axes 182,184, respectively, is blocked. It is preferred, as shown in FIGS. 23–24, that the length dimension of the second socket 172b and the line connecting the centers of the first and second pin-socket pairs 173a,173b are colinear and parallel to the travel axis. This configuration allows the length of the second socket 172b to accommodate variability in the relative positions of the two pin-socket pairs 173a, 173b; but constrains the second pin 166b within the width dimension of the second socket 172b.

It is more preferred that the first and second mounts 174 are located, one behind the other, on the same rail. This places the length dimension of the second socket 172 parallel with the travel axis 184 and the longest dimension of the rails 134,136 and reduces the width of rail needed to accommodate the first and second mounts 174a, 174b. The second socket 172b is obstructed by second pin 166b from translating along the cross-track axis and is unobstructed to translational repositioning in a direction parallel to the travel axis, within the limits of the ends of the second socket 172b. In this embodiment, the first and second pins 166a,166b, do not block the pallet from rotation about the travel axis.

The third socket 172c can be a flat pad and the third pin 166c a post having a flattened free end 168, as shown in FIG. 22A, or a hemispherical free end 168 as in the first and second pins 166a, 166b described above (not separately illustrated). Alternatively, the third pin 166c can be gimballed to the bolster 124, as shown in FIG. 22B. In this case, the third pin 166c has a rod portion 165 that terminates in a hemisphere and a pad portion 167 that pivotably receives the hemisphere of the rod portion 165.

The third socket 172c is unobstructed by the third pin 166c from translating in a plane defined by the cross-track and travel axes 182,184. The third socket 172c is capable of rotation about the third mount axis 180c and rotation about the cross-track and travel axes 182,184 through a hemisphere centered on the third mount axis 180c. Relative rotation of the free end 168 of the third pin 166 and the third socket 172c is biased against by frictional forces and gravity.

The sockets 172 are sized to provide sufficient clearance for the movement of the free ends 168. The sockets 172 can be made as replaceable inserts fitted in the pallet bodies and can be made of a softer material than the pins 166 to shift wear away from the pins 166 to the more easily replaceable inserts. The sockets 172 can be made to wear away over a predetermined range during use, since the wear is not critical to the positioning of the pallet 11 in the raised position.

Figure 29:
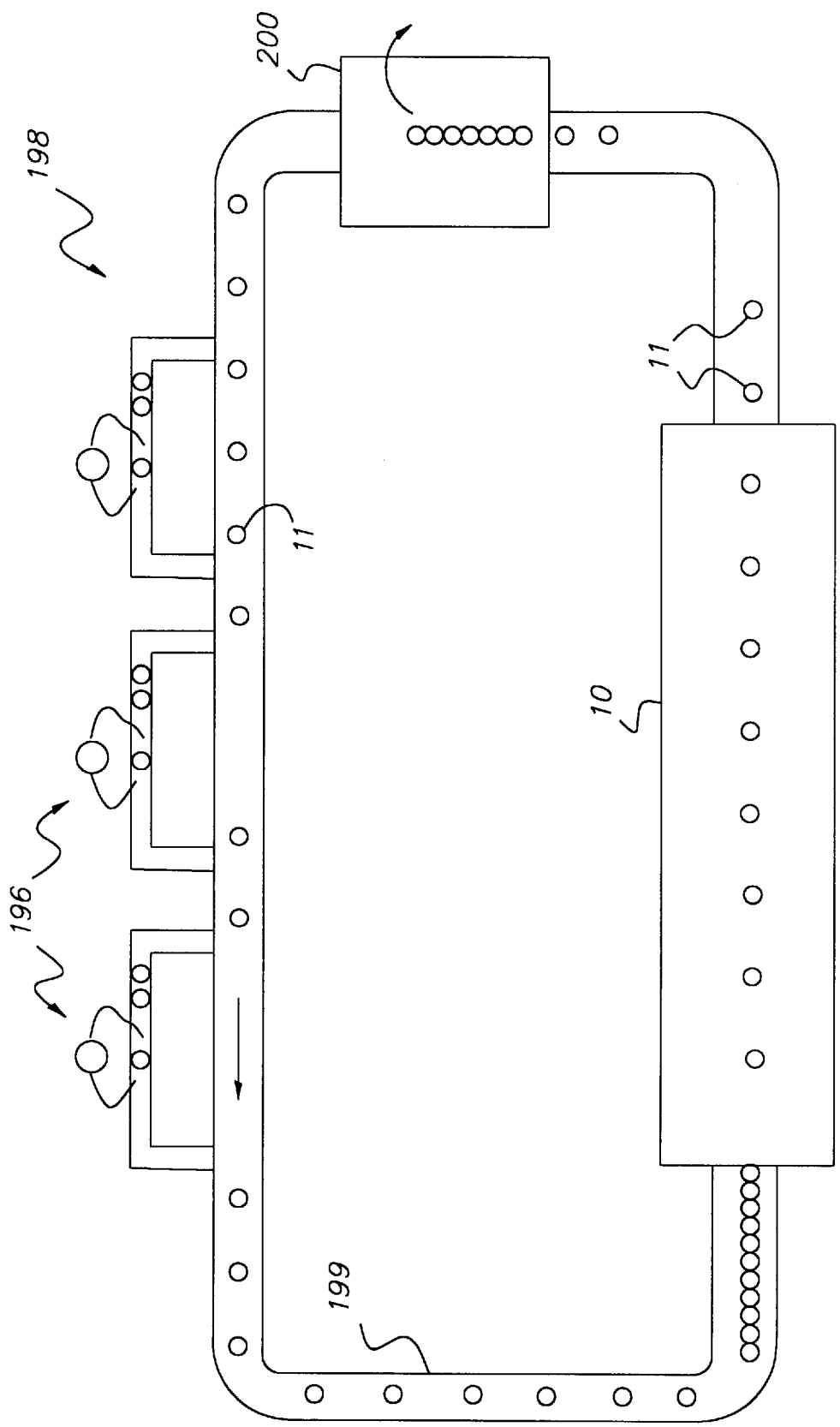
FIGS. 29–32 are schematics of alternative embodiments of the manufacturing system of the invention.
Figure 30:
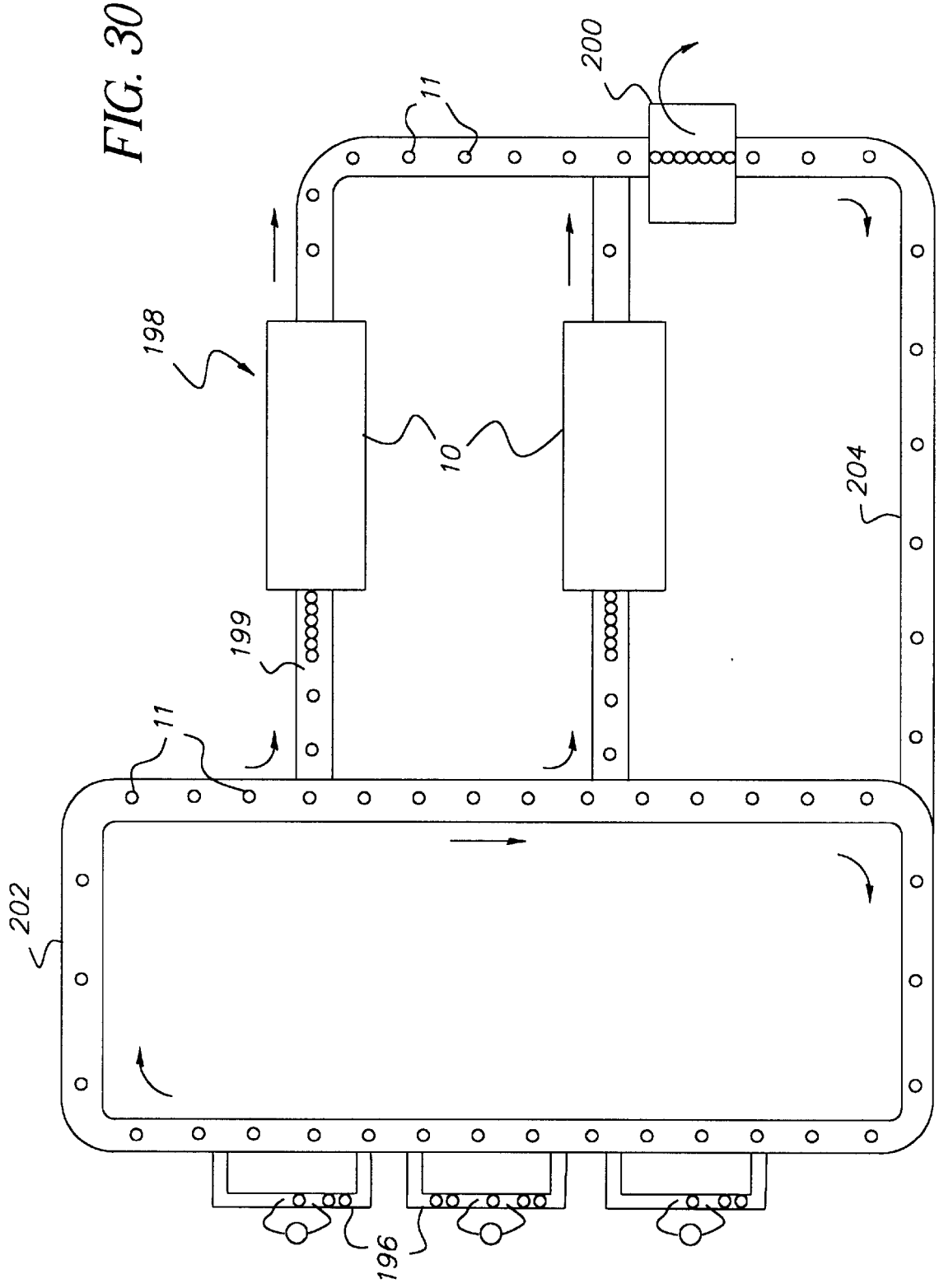
Figure 31:
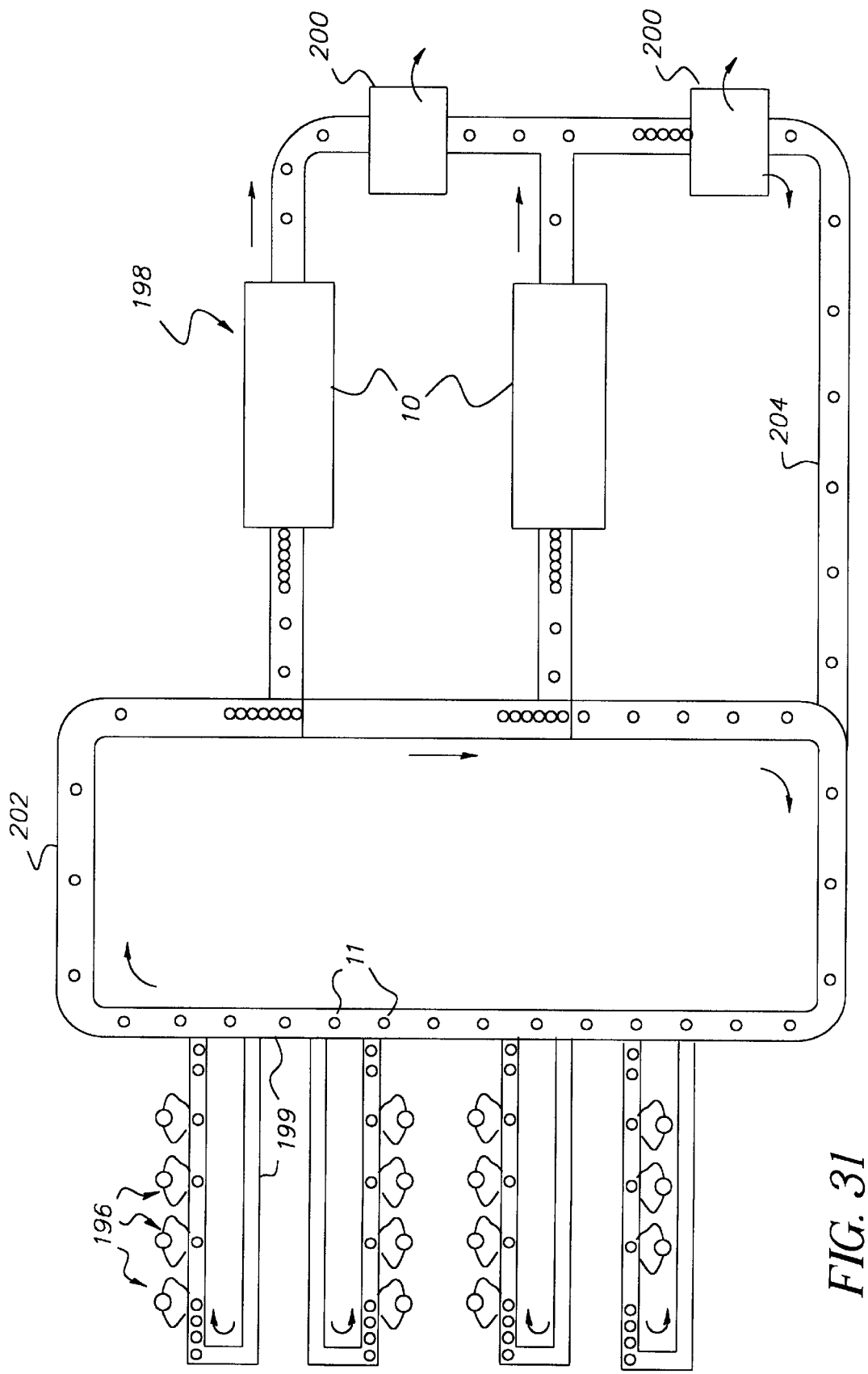
Figure 32:
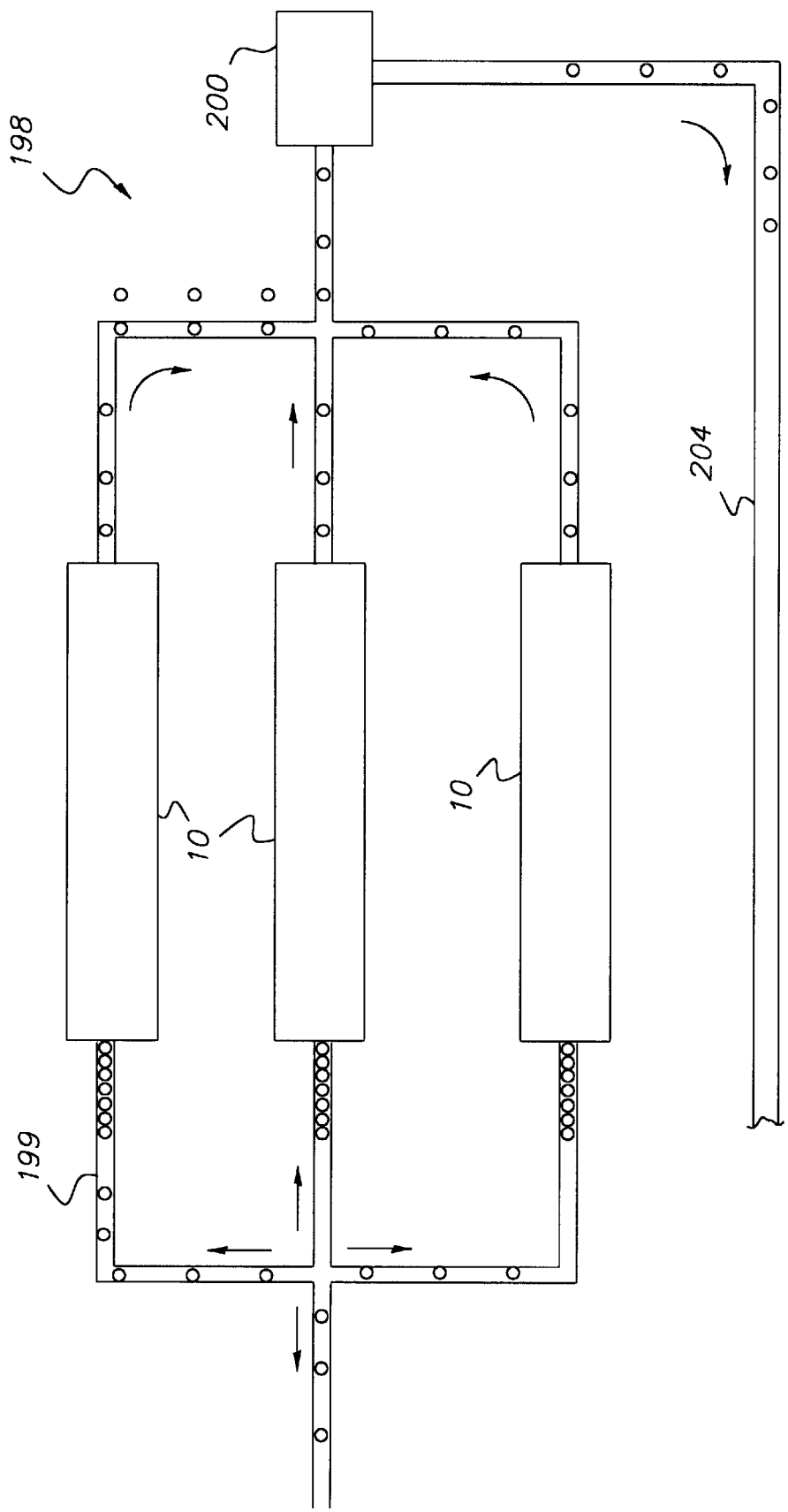

In use, workpieces 12 are subjected to initial operations and are then delivered with pallets 11 to the entry buffer 85 of the apparatus 10. Operations are performed on the workpieces 12 in the apparatus 10 and the workpieces 12 are delivered with the pallets 11 for removal or further operations. Operations within the main chamber 18 of the apparatus 10 are synchronous. Other operations, including transport, can be synchronous or asynchronous. This allows great flexibility in connecting the apparatus 10 with other manufacturing stations 196. For example, FIG. 29 illustrates a manufacturing system 198 having asynchronous manufacturing operations performed manually at three stations 196 followed by asynchronous transport on a conveying system 199 to the apparatus 10 and from the apparatus 10 to an off-feed station 200. FIG. 30 illustrates a manufacturing system 198 having manual stations 196 feeding into a transport loop 202 that selectively feeds ready units alternately, to a pair of apparatus 10 arranged in parallel. Both apparatus 10 feed to an off-feed station 200 and return path 204. FIG. 31 illustrates a manufacturing system 198 similar to that of FIG. 30, but with multiple manual stations 196 on each of a series of feeder loops 202 and multiple off-feed stations 200. FIG. 31 illustrates another branching arrangement for a manufacturing system 198 having multiple apparatus 10. The manufacturing systems 198 are illustrated with manual stations. Individual automated stations are interchangeable with the manual stations. The apparatus 10 are illustrated used in parallel. The apparatus 10 can also be arranged sequentially one behind another, with a synchronous or asynchronous connection between individual apparatus 10.

Figure 6:
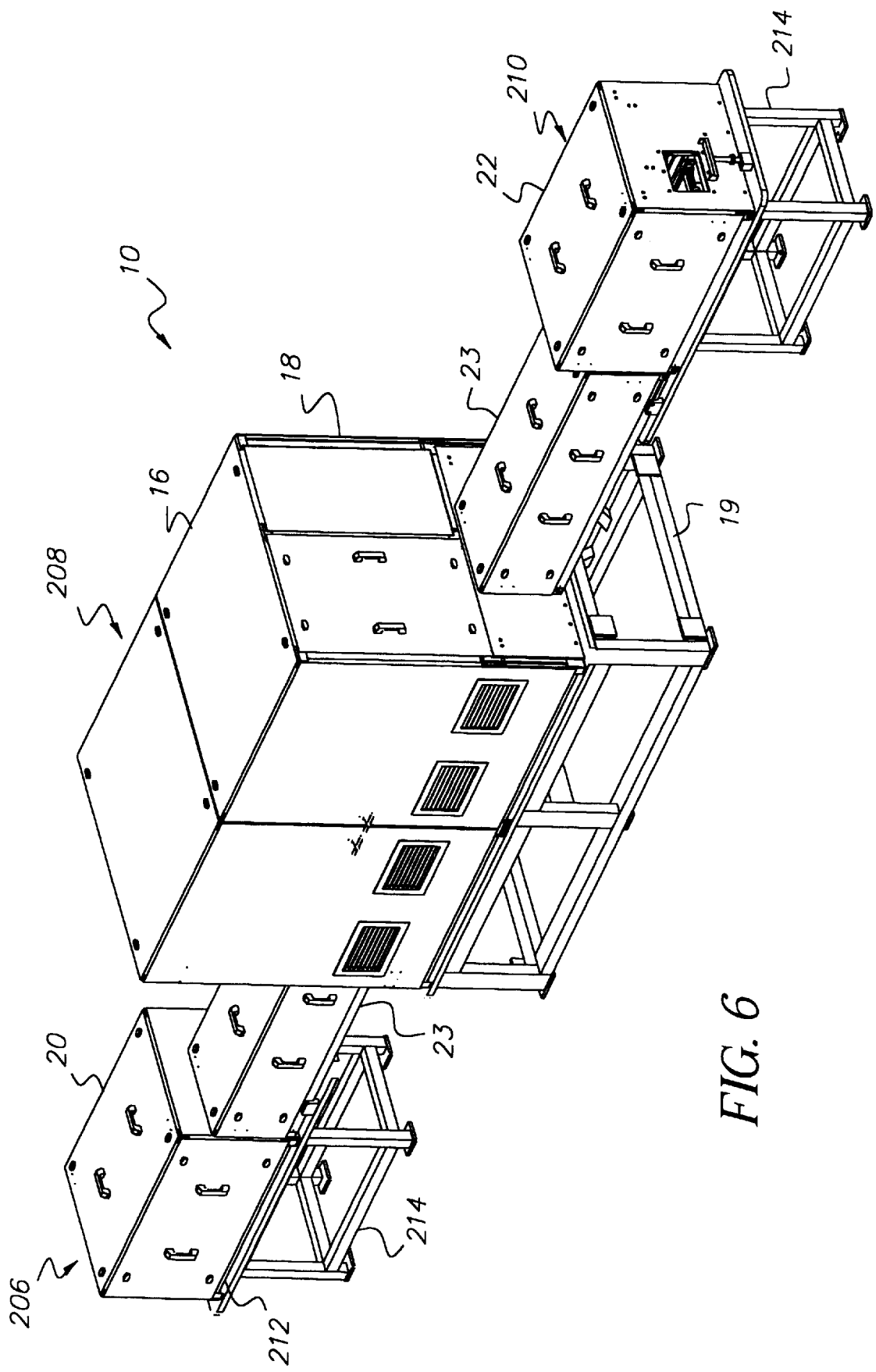
FIG. 6 is a perspective view of the apparatus of FIG. 1 showing the housing.
Figure 7:
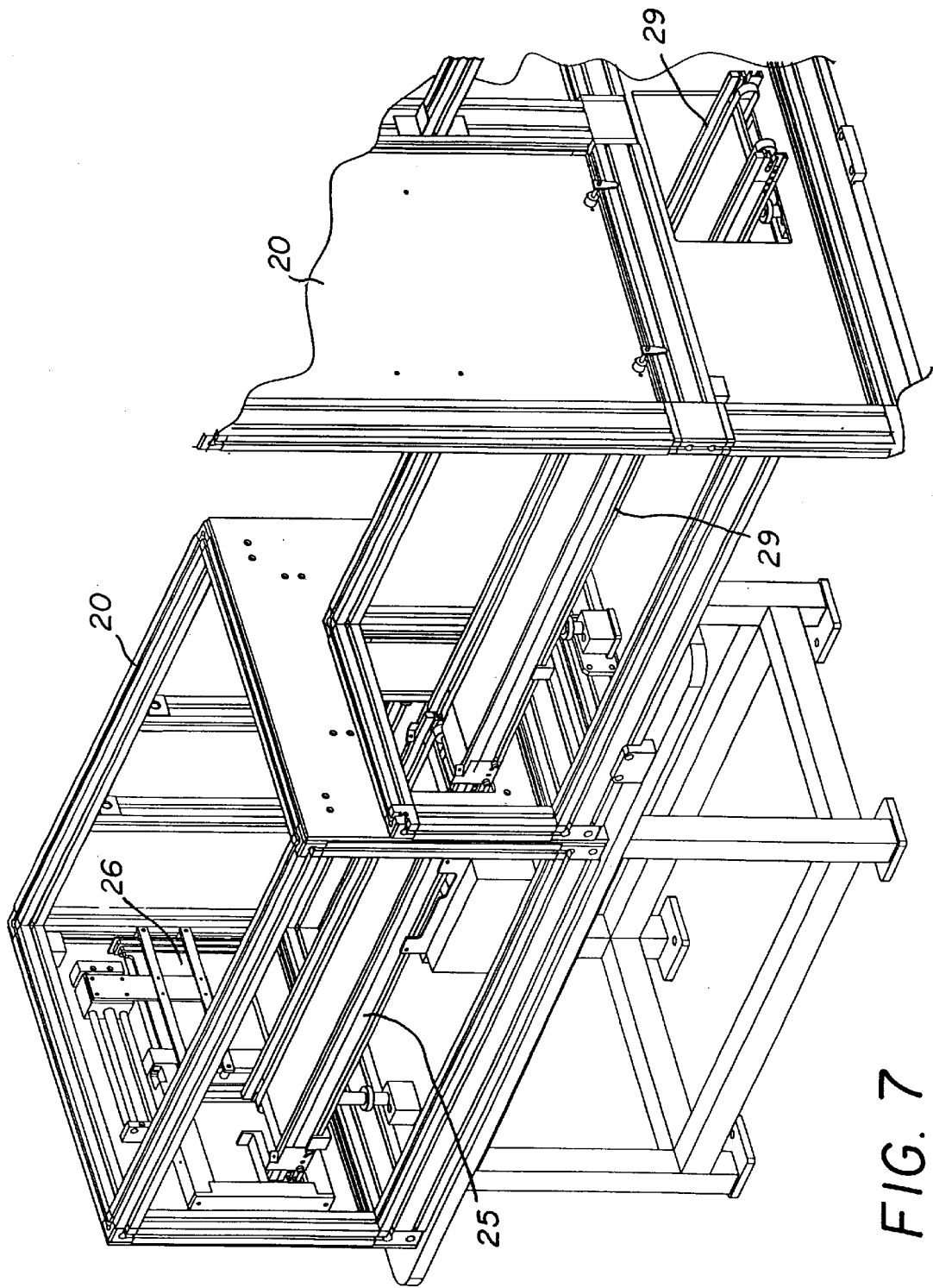
FIG. 7 is a partial enlargement of the infeed end of the apparatus of FIG. 6 with the housing partially cut-away.
Figure 8:
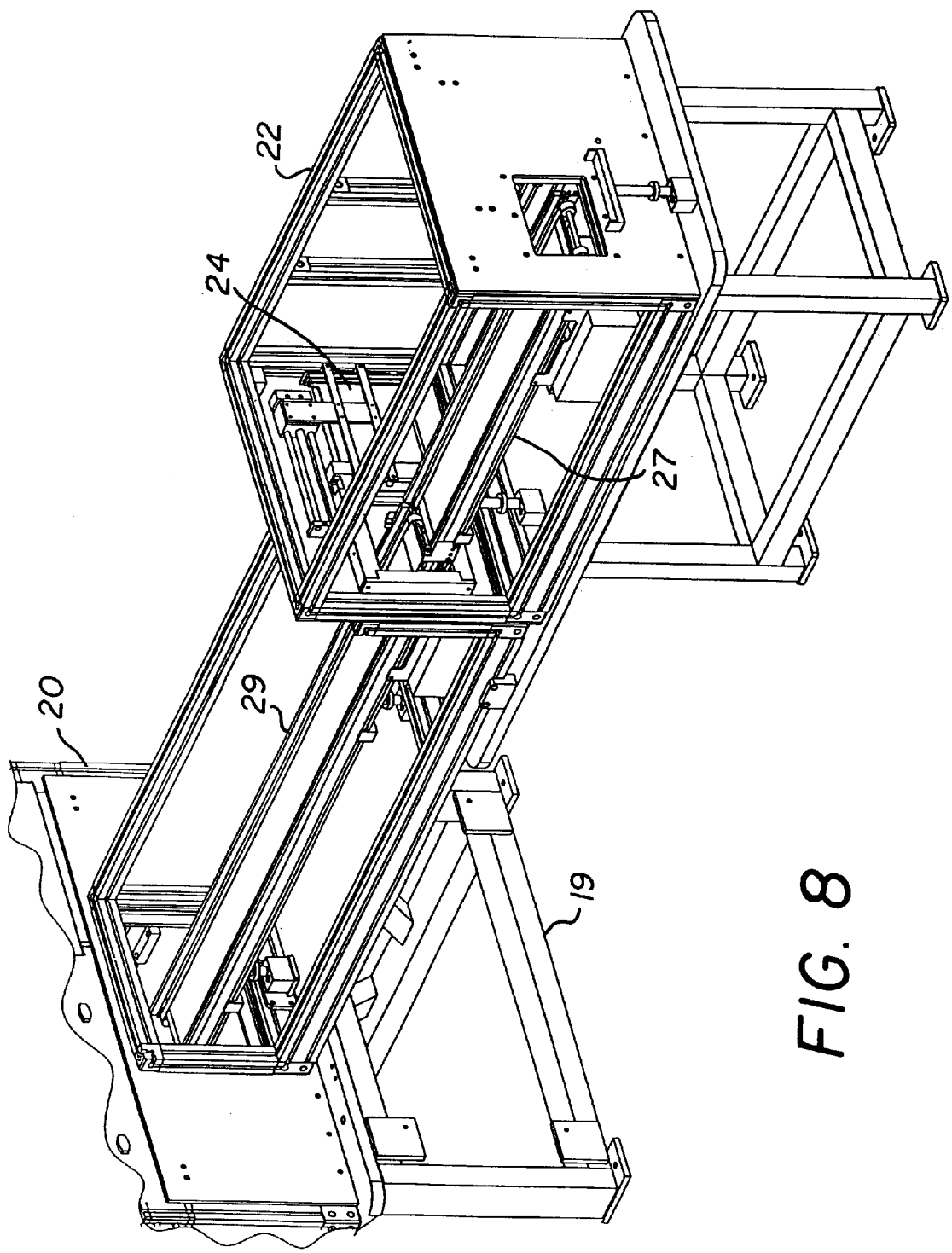
FIG. 8 is a partial enlargement of the outfeed end of the apparatus of FIG. 6 with the housing partially cut-away.
Figure 9:
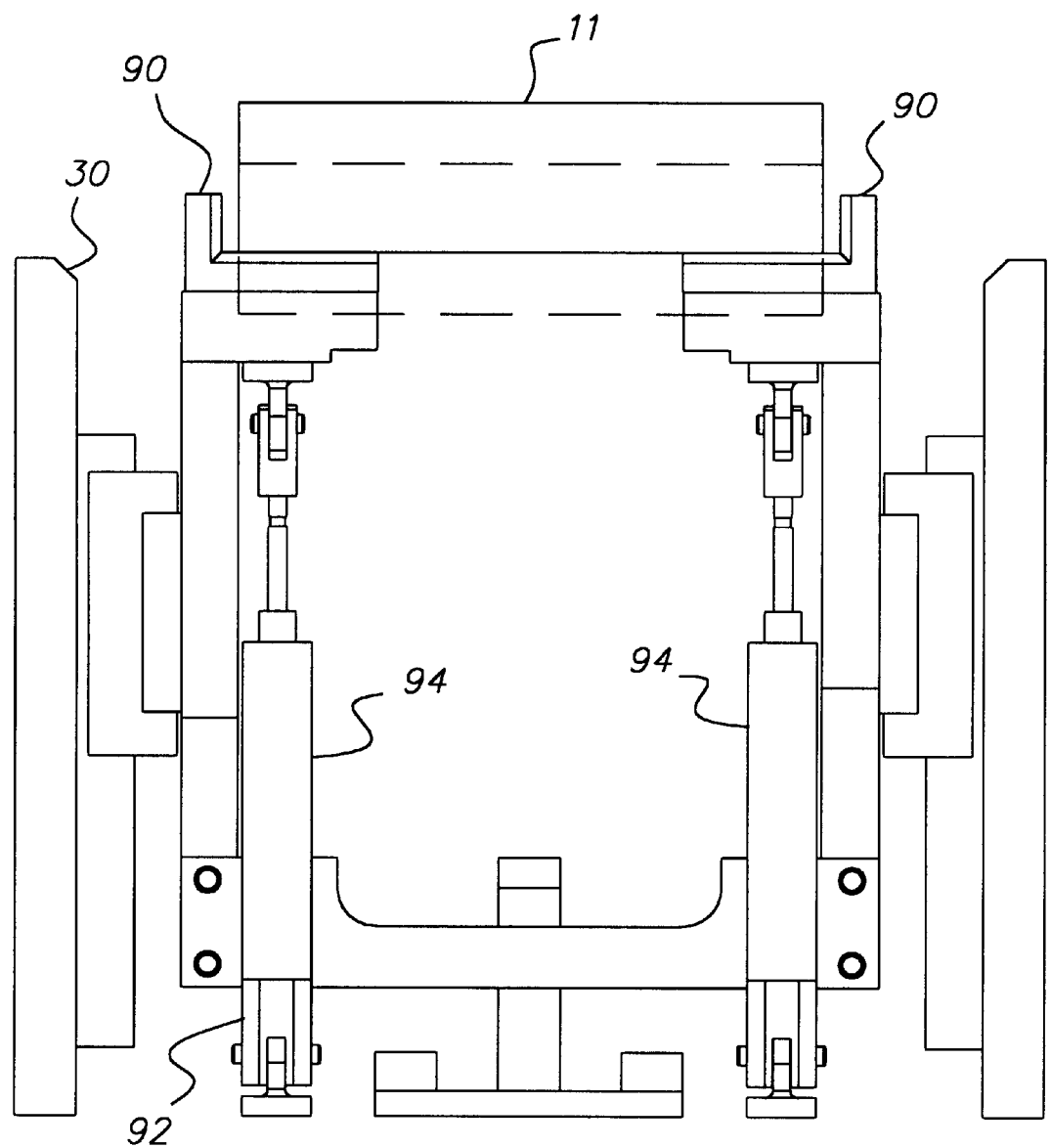
FIG. 9 is a transverse (cross-track) cross-sectional view of the apparatus of FIG. 6 showing one of the elevators. The up and down positions of a pallet are indicated diagrammatically by a solid line rectangle and dashed line rectangle, respectively.

Referring now particularly to FIG. 6, in a particular embodiment of the invention, the apparatus 10 is divided into three separate modules: a entry module 206, a main module 208, and an exit module 210. Each module 206, 208,210 is readily transportable without further disassembly. The entry module 206 has an entry housing 212 including the entry chamber 20 and optionally including a connecting tunnel 23. The entry housing 212 is supported by a secondary support 214 independent of the table support. An entry conveyor 25 is disposed in the entry chamber 20. A stub conveyor 29 extends within the connecting tunnel 23. The exit module 210 is like the entry module 206. The main module 208 includes the remaining components of the apparatus 10, including the main chamber 18, the table base 32, the table 28, the bolster 124 and locating units 128, and the transporter 64. These components can be left in place in the main module 208 when it is transported. In the illustrated embodiments, the main module 208 has the overall configuration of a rectangular box. The box can easily be sized to fit in the requirements of a truck trailer or shipping container. Work devices 48 are optionally also portable with the other components of the main module 208 without disassembly.

Figure 44:
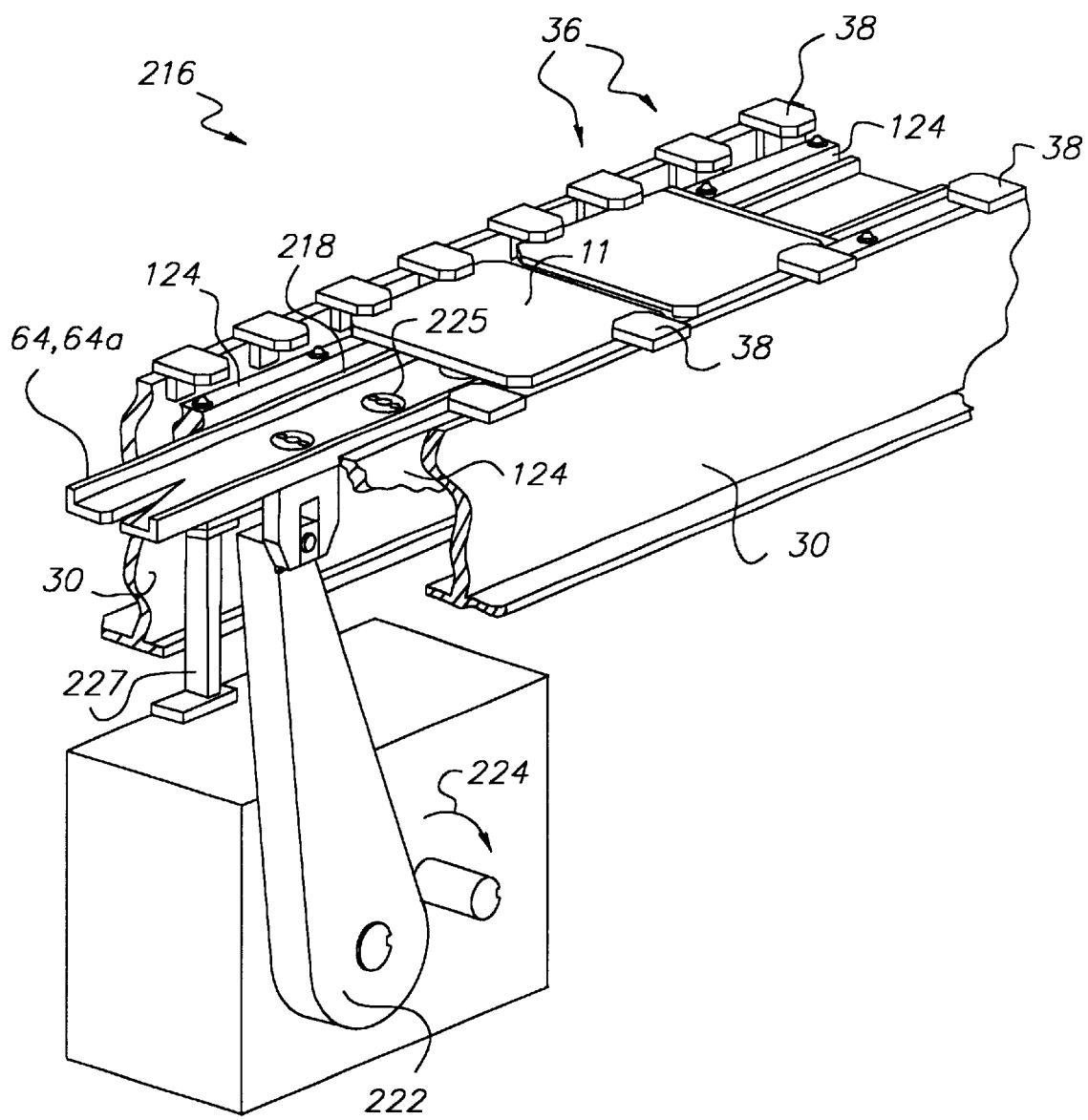
FIG. 44 is a partially cut-away perspective view of another embodiment of the registration mechanism.

The transfer apparatus and registration mechanism are not limited to the embodiments above described. For example, pallet transport for the registration mechanism can be varied. FIG. 44 illustrates an apparatus 216 in which the registration mechanism has a transporter 64 that is a walking beam unit 64a. The walking beam unit 64a includes a pallet support 218, a walking beam drive unit 220, and one or more reciprocating arms 222. The arm or arms 222 are driven by the drive unit 220, as indicated by arrow 224, so as to drive the support about an ellipsoidal path. The support 218 is attached to the arms 222 and, like other walking beam transport apparatus known to those of skill in the art, provides both an up and down movement of the pallets 11 and an advance movement of the pallets from station to station. The up and down movement can be limited by a stop 227 that holds the support during parts of cycles. If necessary, seats 225 or other means can be provided on the support to grip the pallets 11 during advancing. (The pallets 11 would have matching pegs (not shown) or other grip features.) Since the support 218 acts as a walking beam, only the pallets 11 and not the support 218 advance past the datum units 36. The walking beam unit is not used to lift the pallets against the datum units. Like the belt mechanism earlier discussed, only a moderate degree of accuracy and precision is required for the walking beam unit, since transporter wear or misalignment has to be gross to effect registration accuracy and precision. Suitable features of walking beam movements are well known to those of skill in the art. The bolster 124 operates in the same manner as described for other embodiments, except that the pallets 11 are lifted off the support 218. The registration mechanism is otherwise as earlier described.

Figure 45:
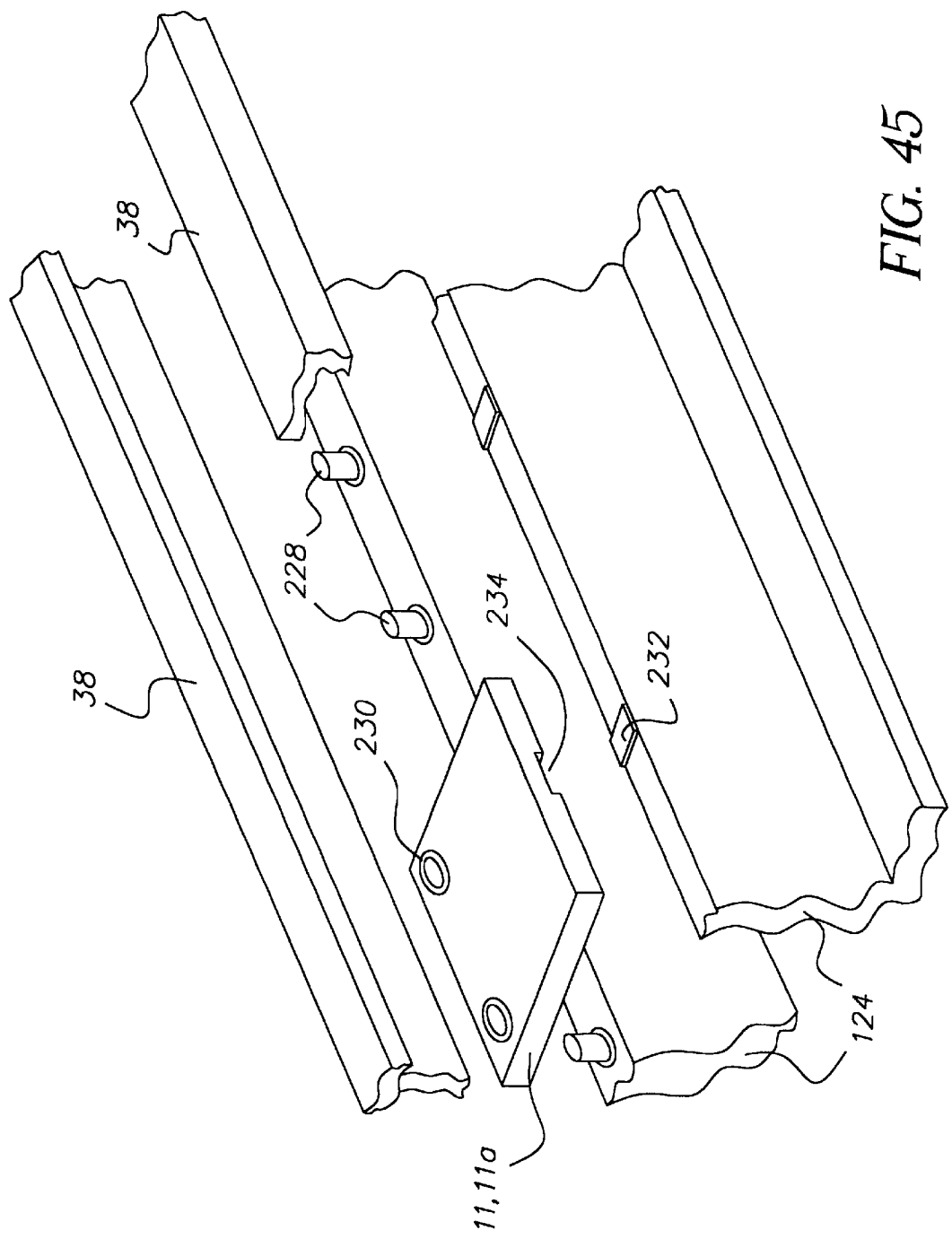
FIG. 45 is a partially cut-away perspective view of another embodiment of the transfer apparatus.

FIG. 45 illustrates another embodiment of the transfer apparatus, in which the data pads 38 are continuous and the locating units each have a pair of cylindrical pins 228 that fit in matching holes 230 in the pallet 11a. A third support is provided by a fixed bushing pad 232 and matching pallet surface 234. The transfer apparatus is otherwise as earlier described. While usable, this approach requires tighter tolerances than the other embodiments earlier discussed.

The invention has been described in detail with particular reference to certain preferred embodiments thereof, but it will be understood that variations and modifications can be effected within the spirit and scope of the invention.

What is claimed is:

1. A registration mechanism comprising:
   a datum unit;
   a bolster segment-pallet pair having a bolster aligned with said datum unit and a pallet disposed between said datum unit and said bolster, said bolster segment-pallet pair having first, second, and third sockets and first, second, and third mounts facing respective said sockets, said mounts defining parallel, first, travel and cross-track mount axes, said pallet having a registering face facing said datum unit, said bolster segment-pallet pair being movable between a lowered position wherein said registering face is spaced apart from said datum unit and a raised position wherein said registering face is in registration with said datum unit; and
   first, second, and third pins supported by said bolster, said pins supporting said pallet, said pins each having a fixed end joined to and restrained from lateral movement by a respective said mount, said pins each having a free end engaging a respective said socket, said free end of said first pin obstructing said first socket from translating along orthogonal travel and cross-track axes perpendicular to said first mount axis, said free end of said first pin allowing rotation of said first socket about said first mount axis and through a hemisphere centered on said first mount axis, said free end of said second pin obstructing said second socket from translating perpendicular to said travel axis, said second socket being unobstructed from translational repositioning along a segment of said travel axis, said second socket being rotatable relative to said free end of said second pin through a hemisphere centered on said second mount axis, said third socket being unobstructed by said third pin from translating along said travel and cross-track axes.

2. The mechanism of claim 1 wherein said pallet is removable from said pins.

3. The mechanism of claim 1 wherein said bolster segment-pallet pair is movable between said lowered position and said raised position in a direction parallel to said mount axes.

4. The mechanism of claim 1 wherein said pins are resiliently biased outward from respective said mounts.

5. The mechanism of claim 1 wherein said bolster and pins clamp said pallet against said datum unit in said raised position.

6. The mechanism of claim 1 said datum unit has opposed registration and alignment faces, and said registering face is clamped against said registration face in said raised position.

7. The mechanism of claim 1 wherein said first pin has a hemispherical tip in engagement with said first socket.

8. The mechanism of claim 7 wherein said second pin has a hemispherical tip and said second socket is an elongate notch sized to closely receive said second pin tip.

9. The mechanism of claim 8 wherein said third pin is a post having a flattened end and said third socket is a flat pad.

10. A registration mechanism comprising:

a datum unit;

a bolster movable toward and away from said datum unit;

first, second, and third pins mounted to said bolster;

at least one spring resiliently biasing said pins outward from said bolster;

a pallet supported by said pins between said bolster and said datum unit, said pallet having first, second, and third sockets aligned with respective said first, second, and third pins, said pallet having a registering face facing said datum unit, said registering face being disposed opposite said sockets, said pallet being movable by said bolster toward said datum unit: from a lowered position, wherein said registering face is spaced from said datum unit and respective said pins and sockets are spaced apart, through a first intermediate position, wherein said registering face is spaced from said datum unit, and said sockets rest freely on respective said pins, then through a second intermediate position, wherein respective said sockets and pins are pressed together in partial counteraction of said resilient biasing, to a raised position, wherein said registering face and said datum unit are clamped together and said sockets are immobilized relative to said pins;

wherein said first pin defines a first mount axis and said first socket is obstructed by said first pin from translating along orthogonal travel and cross-track axes perpendicular to said first mount axis, said first socket being rotatable relative to a free end of said first pin through a hemisphere centered on said first mount axis.

11. A registration mechanism comprising:

a datum unit;

a bolster movable toward and away from said datum unit;

first, second, and third pins mounted to said bolster;

at least one spring resiliently biasing said pins outward from said bolster;

a pallet supported by said pins between said bolster and said datum unit, said pallet having first, second, and third sockets aligned with respective said first, second, and third pins, said pallet having a registering face facing said datum unit, said registering face being disposed opposite said sockets, said pallet being movable by said bolster toward said datum unit: from a lowered position, wherein said registering face is spaced from said datum unit and respective said pins and sockets are spaced apart, through a first intermediate position, wherein said registering face is spaced from said datum unit, and said sockets rest freely on respective said pins, then through a second intermediate position, wherein respective said sockets and pins are pressed together in partial counteraction of said resilient biasing, to a raised position, wherein said registering face and said datum unit are clamped together and said sockets are immobilized relative to said pins;

wherein said second pin defines a second mount axis, said second socket is unobstructed by said second pin from translational repositioning along a segment of a travel axis perpendicular to said second mount axis and is obstructed by said second pin from translating along a cross-track axis perpendicular to said travel axis and second mount axis, said second socket being rotatable relative to a free end of said second pin through a hemisphere centered on said second mount axis, said third socket being unobstructed by a free end of said third pin from translating along said travel and cross-track axes.

12. A registration mechanism comprising:

a datum unit;

a bolster movable toward and away from said datum unit;

a plurality of locating units mounted to said bolster, each said locating units having first, second, and third pins;

at least one spring resiliently biasing said pins outward from said bolster;

a plurality of pallets supported by said locating units, said pallets each having first, second, and third sockets aligned with said first, second, and third pins of a respective said locating unit, said pallet having a registering face facing said datum unit, said registering face being disposed opposite said sockets, said pallet being movable by said bolster toward said datum unit: from a lowered position, wherein said registering face is spaced from said datum unit and respective said pins and sockets are spaced apart, through a first intermediate position, wherein said registering face is spaced from said datum unit, and said sockets rest freely on respective said pins, then through a second intermediate position, wherein respective said sockets and pins are pressed together in partial counteraction of said resilient biasing, to a raised position, wherein said registering face and said datum unit are clamped together and said sockets are immobilized relative to said pins;

wherein said first pin has a hemispherical tip in engagement with said first socket; and wherein said second pin has a hemispherical tip and said second socket is an elongate notch sized to closely receive said second pin tip.

13. The mechanism of claim 12 wherein said third pin is a post having a flattened end and said third socket is a flat pad.

14. A registration mechanism comprising:
a table having a datum unit and a component support, said datum unit being immobile relative to said component support;
a bolster movable toward and away from said datum unit along a mount axis;
first, second, and third pins, said pins each having a fixed end joined to and restrained from lateral movement by said bolster, said pins each having a free end opposite the respective said fixed end;
at least one spring resiliently biasing said pins outward from said bolster;
a pallet supported by said pins between said bolster and said datum unit, said pallet having first, second, and third sockets engaging said free ends of respective said first, second, and third pins, said pallet having a registering face facing said datum unit, said registering face being disposed opposite said sockets, said first socket being cup-shaped and having the same dimension along orthogonal travel and cross-track axes perpendicular to said mount axis, said second socket being trough-shaped and having a width dimension along said cross-track axis shorter than a length dimension along said travel axis, said third socket being flat.

15. A registration mechanism comprising:
a datum unit;
a bolster movable toward and away from said datum unit
first, second, and third pins mounted to said bolster;
at least one spring resiliently biasing said pins outward from said bolster;
a pallet disposed between said bolster and said datum unit, said pallet having first, second, and third sockets aligned with respective said first, second, and third pins, said first pin defining a first mount axis, said pallet being movable by said bolster toward said datum unit: from a lowered position, wherein respective said pins and sockets are spaced apart, through a sequence of intermediate positions, wherein said sockets initially rest freely on respective said pins and are then pressed together in partial counteraction of said biasing, to a raised position, wherein said sockets are immobilized relative to said pins, said first socket, in said intermediate positions, being obstructed by said first pin from translating along orthogonal travel and cross-track axes perpendicular to said first mount axis, said first socket, in said intermediate positions, being rotatable relative to said first pin through a hemisphere centered on said first mount axis.

16. The mechanism of claim 15 wherein said second pin has a hemispherical tip and said second socket is an elongate notch sized to closely receive said second pin tip.

17. The mechanism of claim 16 wherein said third pin is a post having a flattened end and said third socket is a flat pad.

18. The mechanism of claim 15 wherein said third pin is a post having a flattened end and said third socket is a flat pad.

19. The mechanism of claim 15 wherein said second pin defines a second mount axis, said second socket is unobstructed by said second pin from translational repositioning along a segment of a travel axis perpendicular to said second mount axis and is obstructed by said second pin from translating along a cross-track axis perpendicular to said travel and second mount axes, said second socket being rotatable relative to said second pin through a hemisphere centered on said second mount axis.

20. The mechanism of claim 19 wherein said third socket is unobstructed by said third pin from translating along said travel and cross-track axes.

21. The mechanism of claim 19 wherein said first pin has a hemispherical tip in engagement with said first socket.

22. The mechanism of claim 19 wherein said third pin is a post having a flattened end and said third socket is a flat pad.

23. A registration mechanism comprising:
a datum unit;
a bolster movable toward and away from said datum unit;
first, second, and third pins mounted to said bolster;
at least one spring resiliently biasing said pins outward from said bolster;
a pallet disposed between said bolster and said datum unit, said pallet having first, second, and third sockets aligned with respective said first, second, and third pins, said second pin defining a second mount axis, said pallet being movable by said bolster toward said datum unit: from a lowered position, wherein respective said pins and sockets are spaced apart, through a sequence of intermediate positions, wherein said sockets initially rest freely on respective said pins and are then pressed together in partial counteraction of said biasing, to a raised position, wherein said sockets are immobilized relative to said pins, said second socket being unobstructed by said second pin from translational repositioning along a segment of a travel axis perpendicular to said second mount axis and obstructed by said second pin from translating along a cross-track axis perpendicular to said travel and second mount axes, said second socket being rotatable relative to said second pin through a hemisphere centered on said second mount axis, said third socket being unobstructed by said third pin from translating along said travel and cross-track axes.

24. The mechanism of claim 23 wherein said first pin has a hemispherical tip in engagement with said first socket.

25. The mechanism of claim 24 wherein said third pin is a post having a flattened end and said third socket is a flat pad.

* * * * *